US010265778B2

(12) United States Patent
Kaye, Jr. et al.

(10) Patent No.: US 10,265,778 B2
(45) Date of Patent: Apr. 23, 2019

(54) ACCESSORIES FOR OSCILLATING POWER TOOLS

(71) Applicant: BLACK & DECKER INC., New Britain, CT (US)

(72) Inventors: Thomas R. Kaye, Jr., Fallston, MD (US); Bradley J. Nohr, Bel Air, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/406,940

(22) Filed: Jan. 16, 2017

(65) Prior Publication Data

US 2018/0200812 A1 Jul. 19, 2018

(51) Int. Cl.
*B23B 31/10* (2006.01)
*B26D 7/26* (2006.01)
(Continued)

(52) U.S. Cl.
CPC ............ *B23B 31/10* (2013.01); *B23D 61/006* (2013.01); *B24B 23/04* (2013.01); *B26D 7/2614* (2013.01);
(Continued)

(58) Field of Classification Search
CPC ... B23B 31/10; B23B 31/19; B23B 2231/024; B27B 19/006; B27B 5/30; B27B 5/32;
(Continued)

(56) References Cited

U.S. PATENT DOCUMENTS 694,597 A 3/1902 Wood
2,305,466 A 12/1942 Bangser
(Continued)

FOREIGN PATENT DOCUMENTS

AU 2006305634 4/2007
CH 657411 A5 8/1986
(Continued)

OTHER PUBLICATIONS

Machine Translation, WO 2014198525 A1, Brand, G., Dec. 18, 2014.*

(Continued)

*Primary Examiner* — Eric A Gates
*Assistant Examiner* — Chwen-Wei Su
(74) *Attorney, Agent, or Firm* — Scott B. Markow

(57) ABSTRACT

An accessory for coupling to an oscillating power tool includes a working end portion and an attachment portion. The working end portion defines and extends along a working axis. The attachment portion is coupled to the working end portion and includes a top wall, a bottom wall spaced apart from the top wall, and a peripheral wall extending from the top wall to the bottom wall at least partially around the top wall to form at least a portion of a polygonal shape. A generally U-shaped opening is defined in the top wall, extends along an attachment axis at an angle to the working axis, has a central portion at a center of the attachment portion, and is open to a gap in the peripheral wall. A plurality of radial openings is defined in the top wall and arranged between the U-shaped opening and the peripheral wall. The peripheral wall, the U-shaped opening, and the plurality of radial openings are configured to couple the attachment portion to at least two different configurations of accessory attachment mechanisms on different oscillating power tools.

19 Claims, 17 Drawing Sheets

(51) Int. Cl.
*B23D 61/00* (2006.01)
*B24B 23/04* (2006.01)
*B27B 19/00* (2006.01)
*B23B 31/19* (2006.01)

(52) U.S. Cl.
CPC ............ *B27B 19/006* (2013.01); *B23B 31/19* (2013.01); *B26D 7/2621* (2013.01); *Y10T 279/33* (2015.01)

(58) Field of Classification Search
CPC ....... B24B 23/02; B24B 23/04; B24B 45/006; B23D 61/006; Y10T 279/33
See application file for complete search history.

(56) References Cited

U.S. PATENT DOCUMENTS

D137,633 S 4/1944 Jacobsen
2,693,365 A 11/1954 Zelewsky
2,785,515 A 3/1957 Sansig
2,997,819 A 8/1961 Schact
3,055,497 A 9/1962 Klonski
3,440,915 A 4/1969 Weyant
3,554,197 A 1/1971 Dobbie
3,656,393 A 4/1972 Goellner
3,905,374 A 9/1975 Winter
3,943,934 A 3/1976 Bent
4,015,371 A 4/1977 Grayston
4,059,930 A 11/1977 Alessio
4,106,181 A 8/1978 Mattchen
4,112,541 A 9/1978 Tetradis
4,252,121 A 2/1981 Arnegger
4,253,776 A 3/1981 Orain
4,265,285 A 5/1981 Fodor
4,386,609 A 6/1983 Mongeon
4,393,626 A 7/1983 Schroer
4,513,742 A 4/1985 Arnegger
4,590,837 A 5/1986 Nanba
4,597,227 A 7/1986 Gentischer et al.
4,599,077 A 7/1986 Vuillard
4,648,735 A 3/1987 Oddenino
4,700,478 A 10/1987 Mezger et al.
4,784,034 A 11/1988 Stones et al.
4,825,091 A 4/1989 Breyer et al.
4,891,884 A 1/1990 Torbet
RE33,335 E 9/1990 Gentischer et al.
4,980,976 A 1/1991 Junginger et al.
4,989,374 A 2/1991 Rudolf et al.
5,022,188 A 6/1991 Borst
5,027,684 A 7/1991 Neukam
5,038,478 A 8/1991 Mezger et al.
5,064,325 A 11/1991 McRoskey
5,085,589 A 2/1992 Kan
5,107,737 A 4/1992 Tagliaferri
5,122,142 A 6/1992 Pascaloff
5,157,873 A 10/1992 Rudolf et al.
5,199,223 A 4/1993 Rudolf et al.
5,219,378 A 6/1993 Arnold
5,235,719 A 8/1993 Wimberley
5,263,283 A 11/1993 Rudolf et al.
5,265,343 A 11/1993 Pascaloff
5,269,784 A 12/1993 Mast
D343,247 S 1/1994 Walen
5,303,688 A 4/1994 Chiuminatta et al.
5,306,025 A 4/1994 Langhoff
5,306,285 A 4/1994 Miller et al.
5,309,805 A 5/1994 Mezger et al.
5,352,229 A 10/1994 Goble et al.
5,366,312 A 11/1994 Raines
5,382,249 A 1/1995 Fletcher
5,423,825 A 6/1995 Levine
5,435,063 A 7/1995 Russo
D360,946 S 8/1995 Goris
5,440,811 A 8/1995 Challis
D362,065 S 9/1995 Goris
5,468,247 A 11/1995 Matthai et al.
5,480,507 A 1/1996 Arnold
5,489,285 A 2/1996 Goris
5,496,316 A 3/1996 Goris
D368,777 S 4/1996 Goble et al.
5,507,763 A 4/1996 Petersen et al.
D374,286 S 10/1996 Goble et al.
D374,287 S 10/1996 Goble et al.
D374,482 S 10/1996 Goble et al.
5,658,304 A 8/1997 Lim
5,676,680 A 10/1997 Lim
5,694,693 A 12/1997 Hutchins et al.
5,702,415 A 12/1997 Matthai et al.
5,729,904 A 3/1998 Trott
5,735,866 A 4/1998 Adams et al.
D394,315 S 5/1998 Fisher
5,785,571 A 7/1998 Camp
5,829,931 A 11/1998 Doumani
5,839,196 A 11/1998 Trott
5,848,473 A 12/1998 Brandenburg, Jr.
D404,485 S 1/1999 Hutchins et al.
5,857,237 A 1/1999 Dranginis
D405,177 S 2/1999 Hutchins et al.
D406,223 S 3/1999 Tran
5,957,469 A 9/1999 Miles et al.
6,022,353 A 2/2000 Fletcher et al.
6,073,939 A 6/2000 Steadings et al.
6,082,515 A 7/2000 Oono et al.
6,099,397 A 8/2000 Wurst
6,116,996 A 9/2000 Yanase
6,132,282 A 10/2000 Camp
6,132,300 A 10/2000 Martin
6,179,301 B1 1/2001 Steadings et al.
6,196,554 B1 3/2001 Gaddis et al.
6,241,259 B1 6/2001 Gaddis et al.
6,340,022 B1 1/2002 Schroer
D459,805 S 7/2002 Pascaloff
6,430,465 B2 8/2002 Cutler
6,434,835 B1 8/2002 Grunikiewicz et al.
6,435,521 B2 8/2002 Steadings et al.
D462,766 S 9/2002 Jacobs et al.
6,488,287 B2 12/2002 Gaddis et al.
6,499,381 B2 12/2002 Ladish et al.
6,503,253 B1 1/2003 Fletcher et al.
6,536,536 B1 3/2003 Gass et al.
6,569,001 B2 5/2003 Rudolf et al.
6,629,484 B2 10/2003 Soyama et al.
6,678,106 B2 1/2004 Haugen et al.
6,705,807 B1 3/2004 Rudolph et al.
6,723,101 B2 4/2004 Fletcher et al.
D489,823 S 5/2004 Fisher et al.
6,747,745 B2 6/2004 Ishikawa et al.
6,796,888 B2 9/2004 Jasch
6,802,764 B2 10/2004 Besch
6,832,764 B2 12/2004 Steadings et al.
6,834,730 B2 12/2004 Gass et al.
6,865,813 B2 3/2005 Pollak
6,869,346 B2 3/2005 Wendt et al.
6,945,862 B2 9/2005 Jasch et al.
6,949,110 B2 9/2005 Ark et al.
6,968,933 B2 11/2005 Buckhouse et al.
7,001,403 B2 2/2006 Hausmann et al.
7,015,445 B2 3/2006 Bishop
7,077,735 B2 7/2006 Krondorfer et al.
7,093,668 B2 8/2006 Gass et al.
7,107,691 B2 9/2006 Nottingham et al.
7,115,027 B2 10/2006 Thomaschewski
7,121,358 B2 10/2006 Gass et al.
7,128,503 B2 10/2006 Steadings et al.
7,169,025 B2 1/2007 Schumacher
7,175,625 B2 2/2007 Culbert
7,189,239 B2 3/2007 Fisher et al.
7,207,873 B2 4/2007 Hesse et al.
7,217,177 B2 5/2007 Frech et al.
D544,007 S 6/2007 Marasco
7,225,714 B2 6/2007 Rompel et al.
7,237,988 B2 7/2007 Steadings et al.
7,258,351 B2 8/2007 Hoffmann et al.
7,258,515 B2 8/2007 Krondorfer

(56) References Cited

U.S. PATENT DOCUMENTS 7,328,752 B2 2/2008 Gass et al.
7,334,511 B2 2/2008 Hesselberg et al.
D563,186 S 3/2008 Ahn
7,344,435 B2 3/2008 Pollak et al.
7,447,565 B2 11/2008 Cerwin
7,478,979 B2 1/2009 Zhou et al.
7,481,608 B2 1/2009 Zhou et al.
7,497,860 B2 3/2009 Carusillo et al.
7,527,628 B2 5/2009 Fletcher et al.
7,533,470 B2 5/2009 Nottingham et al.
7,537,065 B2 5/2009 Gallagher et al.
7,540,334 B2 6/2009 Gass et al.
7,690,871 B2 4/2010 Steadings et al.
7,699,568 B2 4/2010 Nickels, Jr. et al.
7,717,191 B2 5/2010 Trautner
7,717,192 B2 5/2010 Schroeder et al.
7,726,917 B2 6/2010 MacK
7,735,575 B2 6/2010 Trautner
7,746,448 B2 6/2010 Franitza et al.
D619,152 S 7/2010 Evatt et al.
7,753,381 B2 7/2010 Nickels, Jr. et al.
7,762,349 B2 7/2010 Trautner et al.
7,784,166 B2 8/2010 Tanner
D623,034 S 9/2010 Evatt et al.
7,798,245 B2 9/2010 Trautner
7,833,241 B2 11/2010 Gant
7,841,601 B2 11/2010 MacK
7,854,274 B2 12/2010 Trautner et al.
D633,769 S 3/2011 Evatt et al.
D633,928 S 3/2011 Nilsson et al.
7,901,424 B2 3/2011 Fletcher et al.
7,950,152 B2 5/2011 Gallego
7,976,253 B2 7/2011 Steadings et al.
7,987,920 B2 8/2011 Schroeder et al.
7,997,586 B2 8/2011 Ziegler et al.
D646,539 S 10/2011 Maras
D646,540 S 10/2011 Maras
D646,542 S 10/2011 Wackwitz
8,038,156 B2 10/2011 Nickels, Jr. et al.
D648,762 S 11/2011 Mack
8,047,100 B2 11/2011 King
D651,062 S 12/2011 Wackwitz
8,070,168 B2 12/2011 MacK
8,082,671 B2 12/2011 Saegesser
D651,499 S * 1/2012 Tong ................................ D8/70
D651,874 S 1/2012 Davidian et al.
D651,875 S 1/2012 Davidian et al.
D651,876 S 1/2012 Davidian et al.
D651,877 S 1/2012 Davidian et al.
D651,878 S 1/2012 Davidian et al.
D652,274 S 1/2012 Davidian et al.
D653,523 S 2/2012 Wackwitz et al.
8,109,343 B2 2/2012 Schroeder et al.
8,113,520 B2 2/2012 Zaiser et al.
8,151,679 B2 4/2012 Bohne
D665,242 S 8/2012 Wackwitz
D669,754 S 10/2012 Wackwitz
D682,651 S 5/2013 McRoberts et al.
D682,652 S 5/2013 McRoberts et al.
D693,193 S 11/2013 Bozic
D694,076 S 11/2013 Davidian et al.
D694,077 S 11/2013 Bozic
8,585,469 B2 11/2013 Grunikiewicz
D694,596 S 12/2013 Davidian et al.
D694,597 S 12/2013 Davidian et al.
D694,598 S 12/2013 Davidian et al.
D694,599 S 12/2013 Davidian et al.
8,616,562 B2 12/2013 Maras
D697,384 S 1/2014 Wackwitz
D697,776 S 1/2014 Bozic
D697,777 S 1/2014 Bozic
D706,595 S 6/2014 Kaye et al.
8,827,278 B2 9/2014 Chen et al.
8,915,499 B2 12/2014 Kaye et al.
8,925,931 B2 1/2015 Sergyenko et al.
8,950,756 B2 2/2015 Lu et al.
9,044,874 B2 6/2015 Zhang et al.
D734,649 S 7/2015 Wackwitz
9,073,195 B2 7/2015 Kaye, Jr. et al.
9,120,216 B2 9/2015 Zhang et al.
9,186,770 B2 11/2015 Montplaisir et al.
D746,655 S 1/2016 Wackwitz
9,242,361 B2 1/2016 Kaye, Jr. et al.
9,486,909 B2 11/2016 Zieger et al.
9,555,554 B2 1/2017 Thorson et al.
D789,759 S 6/2017 Fellmann et al.
9,694,472 B2 7/2017 Luescher et al.
9,737,969 B2 8/2017 Bek et al.
D814,900 S 4/2018 Kaye, Jr. et al.
2001/0041524 A1 11/2001 Steiger et al.
2002/0070037 A1 6/2002 Jasch
2002/0104421 A1 8/2002 Wurst
2002/0116023 A1 8/2002 Fletcher et al.
2002/0198556 A1 12/2002 Ark et al.
2003/0014067 A1 1/2003 Kullmer et al.
2003/0032971 A1 2/2003 Hausmann et al.
2004/0098000 A1 5/2004 Kleinwaechter
2004/0138668 A1 7/2004 Fisher et al.
2004/0204731 A1 10/2004 Gant
2004/0243136 A1 12/2004 Gupta et al.
2005/0178261 A1 8/2005 Thomaschewski
2005/0245935 A1 11/2005 Casey et al.
2006/0123959 A1* 6/2006 Bocast ................ B23D 61/006 83/13
2006/0150428 A1 7/2006 Baculy
2006/0172669 A1 8/2006 Hesse et al.
2006/0217048 A1 9/2006 Frech et al.
2006/0272468 A1 12/2006 Gupta et al.
2006/0282108 A1 12/2006 Tanner
2007/0060030 A1 3/2007 Pollak et al.
2007/0093190 A1 4/2007 Schomisch
2007/0229853 A1 10/2007 Cheng
2007/0266837 A1 11/2007 Nickels et al.
2007/0295156 A1 12/2007 Ziegler et al.
2007/0295165 A1 12/2007 Tanaka et al.
2008/0027449 A1 1/2008 Gundlapalli et al.
2008/0190259 A1 8/2008 Bohne
2008/0196911 A1 8/2008 Krapf et al.
2009/0013540 A1 1/2009 Bohne
2009/0023371 A1 1/2009 Blickle et al.
2009/0051094 A1 2/2009 Sandmeier
2009/0093815 A1 4/2009 Fletcher et al.
2009/0138017 A1 5/2009 Carusillo et al.
2009/0197514 A1 8/2009 Peisert
2009/0198465 A1 8/2009 Decker et al.
2009/0277022 A1 11/2009 Limberg et al.
2009/0312761 A1 12/2009 Boykin et al.
2009/0312762 A1 12/2009 Boykin
2009/0312779 A1 12/2009 Boykin et al.
2009/0318065 A1 12/2009 Zaiser et al.
2009/0320625 A1 12/2009 Kildevaeld
2009/0321625 A1 12/2009 Sieradzki et al.
2010/0003906 A1 1/2010 Zaiser et al.
2010/0009613 A1 1/2010 Frueh
2010/0052269 A1 3/2010 Zaiser et al.
2010/0056029 A1 3/2010 Grunikiewicz
2010/0193207 A1 8/2010 Mok et al.
2010/0197208 A1 8/2010 Blickle et al.
2010/0288099 A1 11/2010 Steiger
2010/0300714 A1 12/2010 Trautner
2011/0000690 A1 1/2011 Kildevaeld
2011/0011605 A1 1/2011 Kildevaeld
2011/0067894 A1 3/2011 Bernardi
2011/0072946 A1 3/2011 Bernardi et al.
2011/0086582 A1 4/2011 Takemura et al.
2011/0097978 A1 4/2011 Hofmann et al.
2011/0127731 A1 6/2011 Woecht et al.
2011/0139472 A1 6/2011 Bohne
2011/0147023 A1 6/2011 Herr
2011/0227300 A1 9/2011 Zhang et al.
2011/0266757 A1 11/2011 Steadings et al.
2011/0266758 A1 11/2011 Sergyeyenko et al.
2011/0266759 A1 11/2011 Goldman
2011/0316241 A1 11/2011 Zhang et al.

(56) References Cited

U.S. PATENT DOCUMENTS

2011/0291368 A1 12/2011 Chen et al.
2011/0309589 A1 12/2011 Maras
2011/0315414 A1 12/2011 Kuntner et al.
2011/0316242 A1 12/2011 Zhang et al.
2012/0025476 A1 2/2012 Nickels, Jr. et al.
2012/0031636 A1 2/2012 King
2012/0073410 A1 3/2012 Hoffman et al.
2012/0090863 A1 4/2012 Puzio et al.
2012/0144676 A1 6/2012 Davidian et al.
2012/0144971 A1 6/2012 Bohne
2012/0169018 A1 7/2012 Lu et al.
2012/0170976 A1 7/2012 Cal
2013/0104719 A1 5/2013 Rubens et al.
2013/0160631 A1* 6/2013 Nagy .................. B23D 61/006 83/848
2013/0193655 A1 8/2013 Kaye et al.
2014/0035242 A1 2/2014 Kaye et al.
2014/0252729 A1 9/2014 Xu
2014/0299345 A1 10/2014 McRoberts et al.
2014/0325855 A1 11/2014 Bozic
2015/0107096 A1 4/2015 Luescher
2015/0266102 A1* 9/2015 Kozak ....................... B25F 3/00 279/143
2016/0096261 A1 4/2016 Kaye, Jr. et al.
2016/0184956 A1 6/2016 Klabunde et al.
2016/0199919 A1 7/2016 Klabunde et al.
2016/0288288 A1 10/2016 Klabunde et al.
2017/0057046 A1* 3/2017 Richter ................... B24B 23/04
2017/0182570 A1* 6/2017 Dvorak .................. B23D 51/00
2017/0348780 A1* 12/2017 Zhang .................. B23D 61/006

FOREIGN PATENT DOCUMENTS

CN 201728642 2/2011
CN 102294684 B 6/2014
DE 1878647 U 8/1963
DE 2915292 A1 10/1980
DE 2935731 A1 4/1981
DE 3203670 A1 8/1983
DE 3520417 A1 12/1985
DE 3833735 A1 4/1989
DE 8618695 U1 9/1989
DE 4036904 C1 5/1992
DE 4425456 A1 * 3/1996 ......... A61B 17/1637
DE 29605728 U1 9/1996
DE 29607061 U1 10/1996
DE 29810157 U1 8/1998
DE 19736933 C1 10/1998
DE 29907671 U1 8/1999
DE 29809788 U1 9/1999
DE 19825408 A1 12/1999
DE 20303018 U1 4/2003
DE 10231393 1/2004
DE 10307840 B3 6/2004
DE 10325392 A1 12/2004
DE 102004020982 A1 11/2005
DE 202006001643 U1 3/2006
DE 102004050799 A1 4/2006
DE 102007018465 A1 10/2008
DE 102007018467 A1 10/2008
DE 202009004549 U1 6/2009
DE 202008001759 U1 7/2009
DE 102008001234 A1 10/2009
DE 202009013147 U1 1/2010
DE 202008011959 U1 2/2010
DE 102009030854 A1 1/2011
DE 202011050511 U1 11/2011
DE 102011005818 A1 9/2012
DE 102011085561 A1 12/2012
DE 102012201624 A1 8/2013
EP 0443362 A2 8/1991
EP 0554929 A1 8/1993
EP 0695607 A1 2/1996
EP 0776634 A2 6/1997
EP 0962283 A1 12/1999
EP 1694477 A1 6/2005
EP 1687120 A1 8/2006
EP 1819490 A1 8/2007
EP 1852218 A1 11/2007
EP 1882538 A2 1/2008
EP 2085182 A1 8/2009
EP 2143531 A1 1/2010
EP 2152475 A1 2/2010
EP 2159000 A1 3/2010
FR 2968589 A3 6/2012
JP 1158205 A 6/1989
JP 2006263914 A 10/2006
WO WO-9424945 A1 11/1994
WO WO-03097299 A1 11/2003
WO WO-2004043269 A1 5/2004
WO WO-2005056256 A1 6/2005
WO WO-2006017066 A2 2/2006
WO WO-2008151866 A1 12/2008
WO WO-2009151958 A2 12/2009
WO WO-2009151959 A1 12/2009
WO WO-2009151965 A1 12/2009
WO WO-2010020458 A1 2/2010
WO WO-2013067960 A1 5/2013
WO WO 2014198525 A1 * 12/2014 ............ B24B 23/04

OTHER PUBLICATIONS

Zimmer Inc., Brochure "Air Drive Blades—The Next Generation" dated Jun. 28, 1993, 1 page; ® 1993 Zimmer, Inc.
Zimmer, Inc., Brochure "More Versatile 'Graft' Blades Available" dated Feb. 15, 1993, 2 pages; ® 1993 Zimmer, Inc.
Materials from Stryker Corporation Brochure published prior to Jan. 1, 1994.
Aloe Medical Instruments "Gall Ball Retractor" Item B-1323, p. 115 ® 1965.
Stryker Maintenance Manual entitled "System II OrthoPower 90 Battery Powered Surgical Instruments"—For Use With: 298-92, 94,96, 98 (Stryker Surgical Brochure 298-92-16 Rev (Mar. 1986).
Sketch a related to p. 9 of the Stryker Maintenance Manual entitled "System II OrthoPower 90 Battery Powered Surgical Instruments" (Mar. 1986).
Hall Surgical brochure—New Opposed-Tooth Blades—published prior to Jan. 1, 1994.
Dremel 6300-05 120-volt Multi-Max Oscillating Kit (retrieved on Sep. 30, 2014) viewed on the internet.https://web.archive.org/web/20091224220316/http://www.amazon.com/Dremel-6300-05-120-Volt-Multi-Max-Oscillating/dp/B002WTCDXO published on Dec. 24, 2009 as per Wayback Machine.
Dewaele, Karl—European Search Report—dated Jun. 20, 2014—7 pages—The Hague.
O'Connell, Wayne—Patent Examination Report No. 3 re Australian Patent Application No. 2011201633—dated Oct. 2, 2014—6 pages—Woden ACT, Canberra, Australia.
Dewaele, Karl—Examination Report re: European Patent Appln. No. 15160839.5-1701—dated Nov. 9, 2016—6 pages.
Canelas, Rui—Extended European Search Report—dated Mar. 23, 2018—6 pages—European Patent Office—Munich.
pp. 2, 3 and 5 of Stryker prior art brochure/-catalog No. 1420 Standard Bone Saw Handpiece, 1100 Series saw blades, and No. 1470 Saittal Plane bone saw with Series 1370 blades—Published prior to Jan. 16, 2017.
Wallenius, Tanya—Communication Pursuant to Article 94(3) EPC—Nov. 23, 2018—3 pages—European Patent Office—Munich Germany.

* cited by examiner

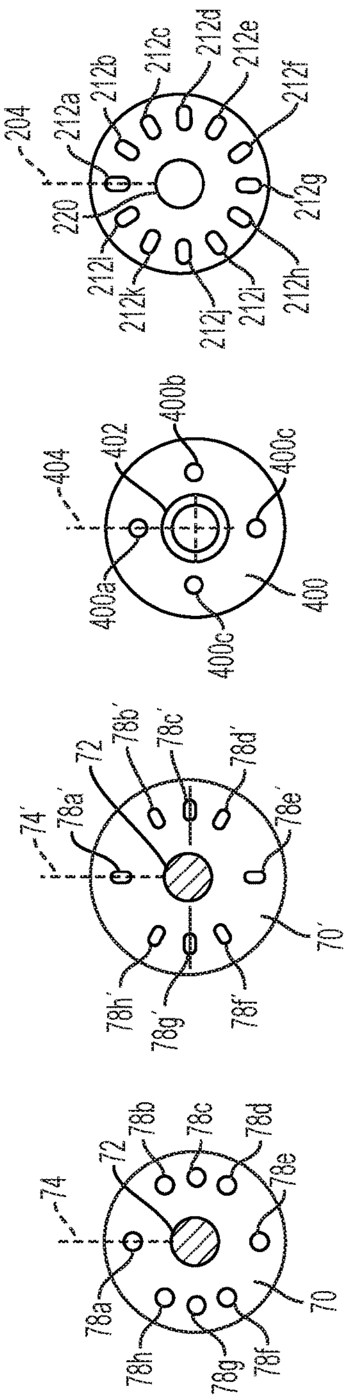
FIG. 5A PRIOR ART
FIG. 5B PRIOR ART
FIG. 5C PRIOR ART
FIG. 5D PRIOR ART
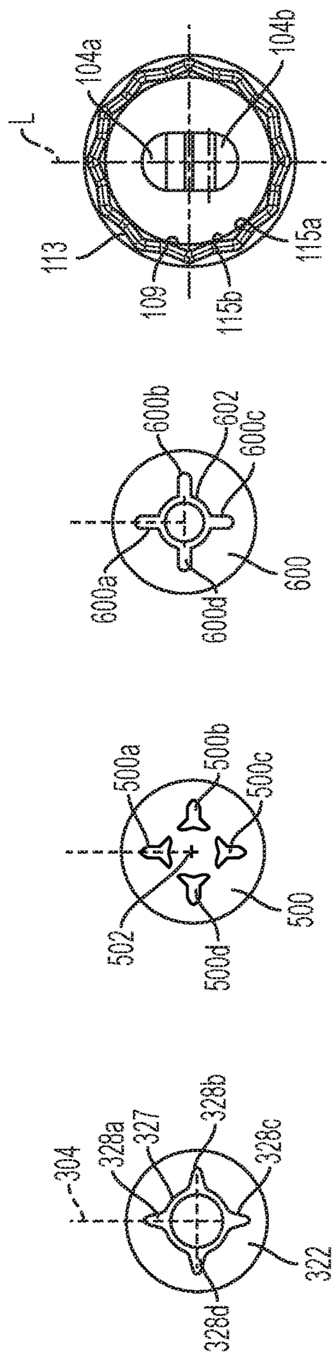
FIG. 5E PRIOR ART
FIG. 5F PRIOR ART
FIG. 5G PRIOR ART
FIG. 5H PRIOR ART

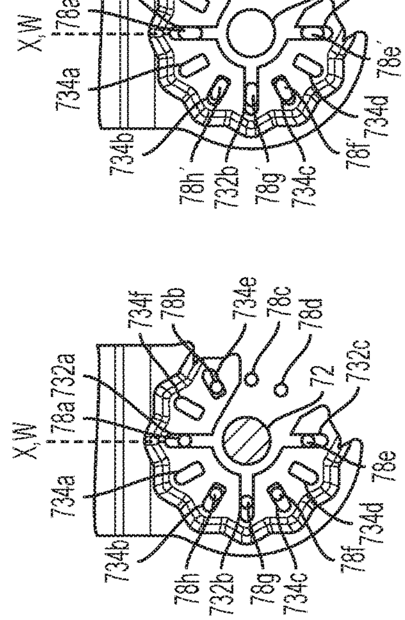
FIG. 7A
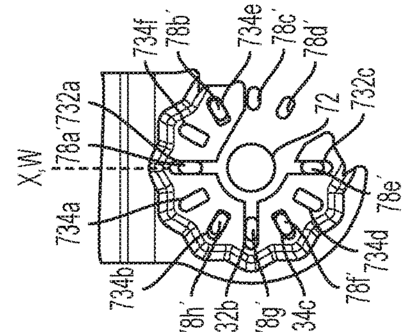
FIG. 7B
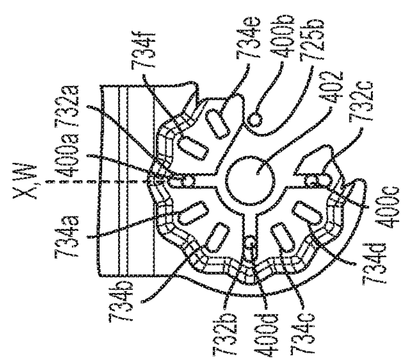
FIG. 7C
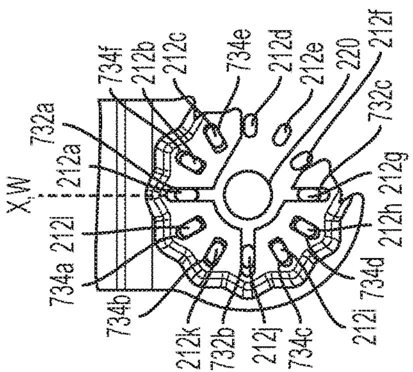
FIG. 7D
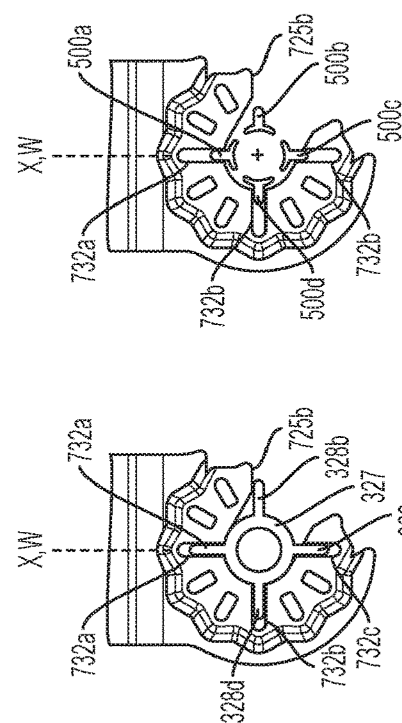
FIG. 7E
FIG. 7F
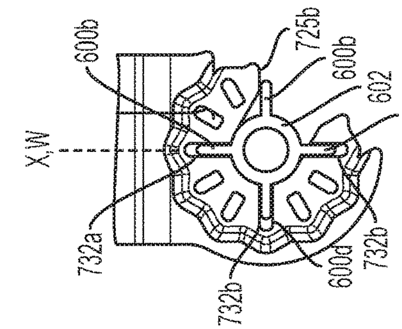
FIG. 7G
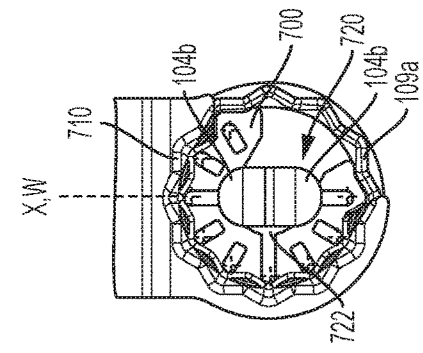
FIG. 7H

ACCESSORIES FOR OSCILLATING POWER TOOLS

TECHNICAL FIELD

This application relates to accessories (such as cutting tools, saw blades, and sanding tools) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. Different brands of oscillating power tools tend to have different, often proprietary, accessory attachment mechanisms. It is desirable to have oscillating accessories with an attachment portion that can be attached to a multitude of different brands of oscillating power tools.

SUMMARY

In an aspect, an accessory for coupling to an attachment mechanism of an oscillating power tool includes a working end portion and an attachment portion. The working end portion defines and extends along a working axis and configured to perform an operation on a workpiece. The attachment portion is coupled to the working end portion and includes a top wall, a bottom wall spaced apart from the top wall, and a peripheral wall extending from the top wall to the bottom wall at least partially around the top wall to form at least a portion of a polygonal shape. A generally U-shaped opening is defined in the top wall, extends along an attachment axis at an angle to the working axis, has a central portion at a center of the attachment portion, and is open to a gap in the peripheral wall. A plurality of radial openings is defined in the top wall and arranged between the U-shaped opening and the peripheral wall. The peripheral wall, the U-shaped opening, and the plurality of radial openings are configured to couple the attachment portion to at least two different configurations of accessory attachment mechanisms on different brands of oscillating power tools.

Implementations of this aspect may include one or more of the following features. The working end portion may include at least one of a cutting edge, a saw blade, a sanding surface, and an abrading surface. Each of the radial openings may extend in a direction radially outward from the central portion. The radial openings may be spaced equiangularly in a circumferential direction around the central portion. The radial openings may include a first plurality of radial openings in communication with the central portion of the U-shaped opening and a second plurality of radial openings not in communication with the U-shaped opening. The first plurality of radial openings may include a first radial arm slot extending from the central portion along the working axis, a second radial arm slot extending from the central opening at approximately 90° from the working axis, and a third radial arm slot extending from the central opening at approximately 180° from the working axis. The second plurality of radial openings may include a first pair of radial openings spaced radially from the central portion and between the first and second radial arm slots, and a second pair of radial openings spaced radially from the central portion and between the second and third radial arm slots. The first pair of radial openings may be at angles of approximately 30 degrees and approximately 60 degrees to the working axis, and the second pair of radial openings may be at angles of approximately 120 degrees and approximately 150 degrees to the working axis. The second plurality of openings may further include a third pair of radial openings spaced radially from the central portion between the first radial arm slot and the U-shaped opening. The third pair of radial openings may be at angles of approximately 30 degrees and approximately 60 degrees to the working axis.

The attachment axis may be at an obtuse angle (e.g., between approximately 120 degrees and approximately 150 degrees) to the working axis. The peripheral wall may include a plurality of sidewalls that form the portion of the polygonal shape. The plurality of sidewalls may form at least a portion of a star shape, with adjacent sidewalls joined to form outer vertices and inner vertices of the portion of the star shape. Each of outer vertices may be aligned with one of the radial openings. The portion of the star shape may comprise a portion of a 12-pointed star. For example, the sidewalls may define at least 7 outer vertices of the portion of the 12-pointed star. Each sidewall may be inclined inward from the bottom wall toward the top wall at an angle, or may be substantially perpendicular to the top wall and to the bottom wall. The U-shaped opening may include a pair of opposing chamfers tapering outward from each other to the gap.

The angle of the attachment axis may be arranged so that an oscillating power tool having two opposed legs that expand along a power tool axis to engage an oscillating accessory will both engage the at least a portion of the top wall when the working axis of the accessory is aligned with and perpendicular to the tool housing axis. For example, the attachment axis may be at an angle of approximately 120° to approximately 150° to the tool axis.

In another aspect, an accessory is configured to be coupled to a first attachment mechanism of a first oscillating power tool that includes a central projection and plurality of circumferentially spaced projections radially outward from the central projection, and configured to be coupled to a second attachment mechanism of a second oscillating power tool having two opposed legs that are radially expandable along a tool axis and a circumferential wall having an internal polygonal shape. The accessory includes a working portion and an attachment portion coupled to the working portion. The working portion defines and extends along a working axis and is configured to perform an operation on a workpiece. The attachment portion includes: (a) a top wall; (b) a bottom wall spaced apart from the bottom wall; (c) a peripheral wall extending between the top wall and the bottom wall and at least partially around the top wall to form at least a portion a polygonal shape that corresponds to the polygonal shape of the second attachment mechanism; (c) a generally U-shaped opening defined in the top wall, the U-shaped opening extending along an attachment axis at an obtuse angle to the working axis, having a central portion at a center of the attachment portion, and open to a gap in the peripheral wall; and (d) a plurality of radial openings defined in the top wall and arranged between the U-shaped opening and the peripheral wall. The obtuse angle and the radial openings are arranged so that the U-shaped opening receives the central projection and at least a portion of the radial openings receive at least a portion of the projections when the attachment portion is coupled to the first oscillating power tool. The obtuse angle and the peripheral wall are arranged so that both of the opposed legs of the second oscillating power tool engage at least a portion of the top wall and the circumferential wall engages the peripheral wall when the attachment portion is retained in the second oscillating power tool with the working axis aligned with or perpendicular to the tool axis.

Implementations of this aspect may include one or more of the following features. The working end portion may include at least one of a cutting edge, a saw blade, a sanding surface, and an abrading surface. Each of the radial openings may extend in a direction radially outward from the central portion. The radial openings may be spaced equiangularly in a circumferential direction around the central portion. The radial openings may include a first plurality of radial openings in communication with the central portion of the U-shaped opening and a second plurality of radial openings not in communication with the U-shaped opening. The first plurality of radial openings may include a first radial arm slot extending from the central portion along the working axis, a second radial arm slot extending from the central opening at approximately 90° from the working axis, and a third radial arm slot extending from the central opening at approximately 180° from the working axis. The second plurality of radial openings may include a first pair of radial openings spaced radially from the central portion and between the first and second radial arm slots, and a second pair of radial openings spaced radially from the central portion and between the second and third radial arm slots. The first pair of radial openings may be at angles of approximately 30 degrees and approximately 60 degrees to the working axis, and the second pair of radial openings may be at angles of approximately 120 degrees and approximately 150 degrees to the working axis. The second plurality of openings may further include a third pair of radial openings spaced radially from the central portion between the first radial arm slot and the U-shaped opening. The third pair of radial openings may be at angles of approximately 30 degrees and approximately 60 degrees to the working axis.

The obtuse angle may be between approximately 120 degrees and approximately 150 degrees. The peripheral wall may include a plurality of sidewalls that form the portion of the polygonal shape. The plurality of sidewalls may form at least a portion of a star shape, with adjacent sidewalls joined to form outer vertices and inner vertices of the portion of the star shape. Each of outer vertices may be aligned with one of the radial openings. The portion of the star shape may comprise a portion of a 12-pointed star. For example, the sidewalls may define at least 7 outer vertices of the portion of the 12-pointed star. Each sidewall may be inclined inward from the bottom wall toward the top wall at an angle, or may be substantially perpendicular to the top wall and to the bottom wall. The U-shaped opening may include a pair of opposing chamfers tapering outward from each other to the gap. The U-shaped opening and the plurality of radial openings may be arranged so that the attachment portion can be coupled to a third attachment mechanism of a third oscillating power tool Advantages may include one or more of the following. The accessory may be coupled to a wide array of brands of oscillating power tools with adequate retention. These and other advantages and features will be apparent from the description, the drawings, and the claims.

BRIEF DESCRIPTION OF THE DRAWINGS

FIGS. 5A-5H are schematic views of several embodiments of attachment mechanisms for oscillating power tools.

FIGS. 7A-7H are schematic views showing coupling of the accessory of FIGS. 6A-6D to the attachment mechanisms for oscillating power tools of FIGS. 5A-5H.

In the drawings, like reference numerals refer to like features.

DETAILED DESCRIPTION

Figure 1A:
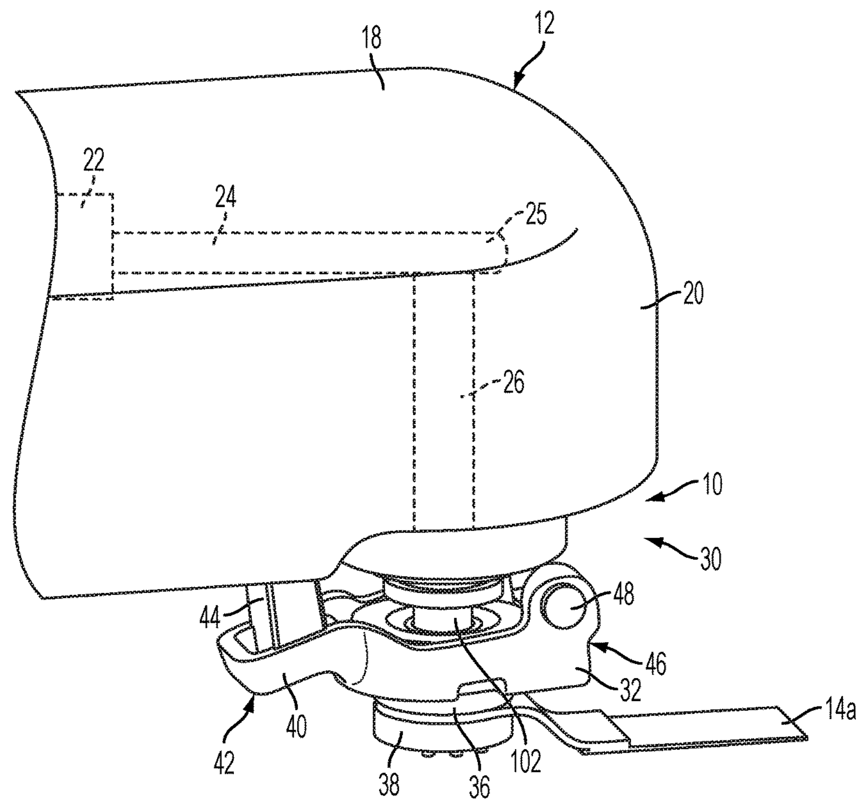
FIG. 1A is a perspective view an oscillating power tool having an embodiment of an accessory attachment mechanism.
Figure 1B:
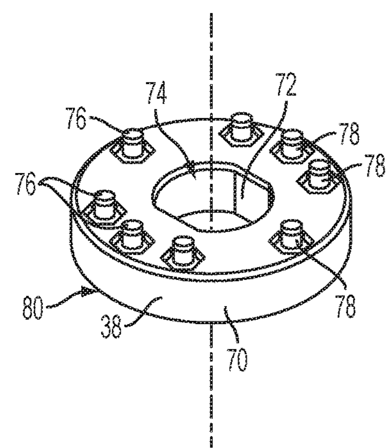
FIG. 1B a perspective view of a clamping plate of the attachment mechanism of FIG. 1A.

Referring to FIGS. 1A and 1B, in an embodiment, an oscillating power tool 12 usable with the accessories described in this application is similar to oscillating power tools sold under the brand names DEWALT® and Porter-Cable® and is described further in U.S. Pat. No. 8,925,931, which is hereby incorporated by reference. The power tool 12 includes a tool body 18 including a housing 20 that contains a motor 22 to drive an output member 24. An output spindle 26 is coupled to the motor 22 via a transmission 25 that converts rotary motion of the motor 22 to oscillating motion of the spindle 26. The output of the spindle 26 is coupled to an accessory attachment mechanism 10 via an output shaft 102.

The accessory attachment mechanism 10 does not require the use of a separate tool to couple an accessory or blade 14*a* to the oscillating power tool (also known as a "tool-free" attachment mechanism). An exemplary tool-free attachment mechanism 10 includes a clamp assembly 30 having a first clamp member 36 fixedly coupled to the output spindle, a second clamp member 38 facing the first clamp member 36, and a lever 32 coupled to the second clamp member 38. The lever 32 includes a lever arm 40 with a user engagement portion 42 and a block 44. The lever 32 further includes a pivot portion 46 having a pivot axle 48. The second clamp member 38 includes a second clamp body 70 generally in the form of a ring having a central opening 72. The second clamp body 70 has a second clamping surface 74 having a plurality of mounting features 76 formed thereon. In the example shown, the plurality of mounting features 76 are in the form of male projections 78. In the particular example shown, the eight male projections 78 each have a circular cross section and a tapered shape or form. In another related embodiment, as shown in FIG. 5B, the male projections may have an oblong, oval, or rectangular cross-section and may also be tapered.

Figure 2A:
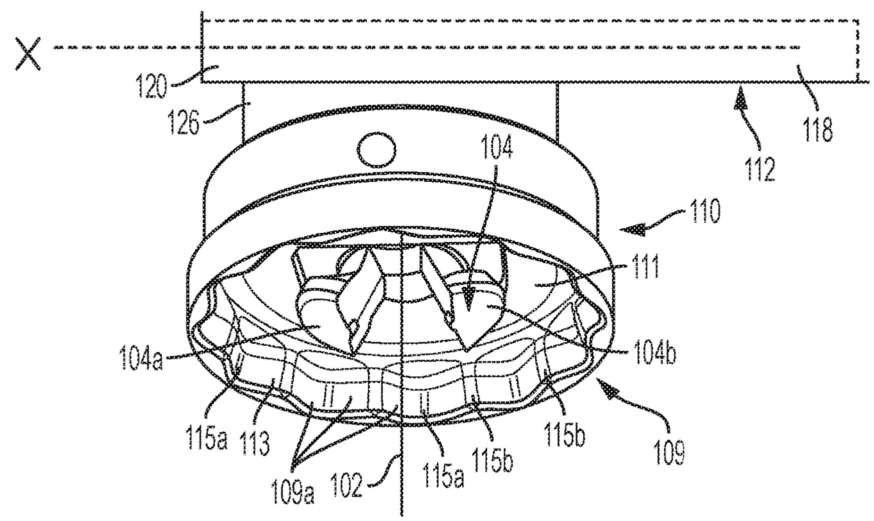
FIG. 2A is a perspective view of another embodiment of an attachment mechanism for an oscillating power tool.
Figure 2B:
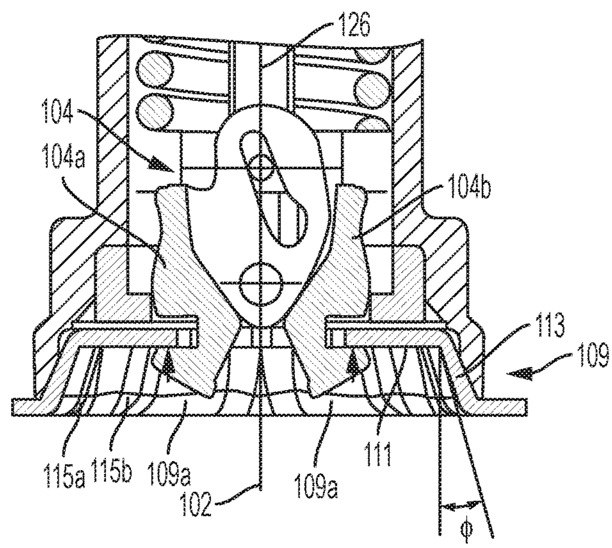
FIG. 2B is a cross-sectional view of the attachment mechanism of FIG. 2A.

Referring to FIGS. 2A and 2B, in another embodiment, an oscillating power tool 112 usable with the accessories described in this application is similar to oscillating power tools sold under the brand name Starlock® and is described further in U.S. Patent App. Pub. Nos. 2016/0288288, 2016/0199919, and 2016/0184956, which are hereby incorporated by reference. The power tool 112 includes a tool body 118 including a housing 120 that defines a tool housing axis X. The housing 120 contains a motor (not shown, similar to motor 22) to drive an output member (not shown, similar to output member 24). An output spindle 126 is coupled to the motor via a transmission (not shown, similar to transmission 25) that converts rotary motion of the motor to oscillating motion of the spindle 126 extending along a driving axis 102. The output of the spindle 126 is coupled to an accessory attachment mechanism 110.

The accessory attachment mechanism 110 includes a holding device 104 that includes radially moveable first and second hook devices or opposed legs 104*a*, 104*b*. The legs 104*a*, 104*b* can be moved radially outward along a direction parallel to the tool axis to engage a central opening in an oscillating accessory. The attachment mechanism 110 also includes a torque transmission region 109 having a top planar wall 111 and a peripheral wall 113 with a plurality of sidewalls 109*a*, each extending outward from the top wall 111 at an angle ϕ (e.g., an acute angle, such as approximately 20° to 22°). Adjacent sidewalls 109*a* are angled relative to one another with adjacent sidewalls joined at outer vertices 115*a* and inner vertices 115*b* to form a star shape (e.g., a 12-point star). In the illustrated embodiment, the outer vertices 115*a* of the star shape are positioned every 30° about the periphery of the peripheral wall 113. The torque transmission region 109 is configured to engage a corresponding peripheral wall of an oscillating accessory.

Figure 3A:
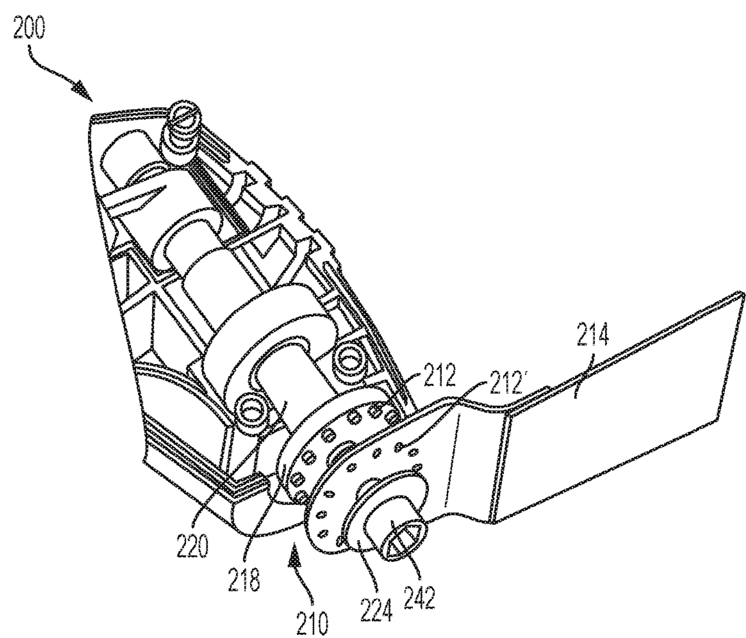
FIG. 3A is a perspective view of another embodiment of an attachment mechanism for an oscillating power tool.
Figure 3B:
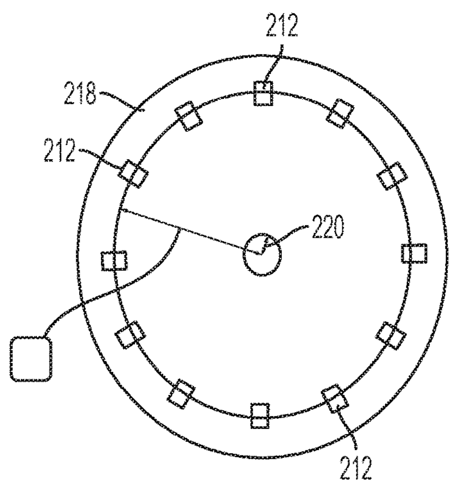
FIG. 3B is a top view of a clamping plate of the attachment mechanism of FIG. 3B.

Referring to FIGS. 3A and 3B, in another embodiment, an oscillating power tool 200 usable with the accessories described in this application is similar to oscillating power tools sold by Bosch® and is described further in U.S. Pat. No. 8,151,679, which is hereby incorporated by reference. The oscillating power tool 200 includes an accessory attachment mechanism 210 that requires the use of a separate tool such as a screwdriver or wrench to couple a blade 214 to the oscillating power tool. Such an exemplary accessory attachment mechanism 210 includes a clamping face 218 that is fixedly attached to an output spindle 220 to oscillate with the spindle 220, and a threaded bolt 242 that can be removably received (using a separate tool) in a threaded bore (not shown) in the spindle 220 and/or in the clamping face 218. The accessory attachment mechanism 210 may optionally include a washer 224 received between the head of the bolt 242 and the clamping face 218. The clamping face 218 includes a plurality of mounting features or form-locking elements in the form of radial lugs or projections 212 configured to engage with a plurality of corresponding recesses or openings 212' In an oscillating blade or accessory 214. The lugs or projections 212' may have a trapezoidal shape or cross-section. To couple an oscillating blade 214 to the oscillating power tool, the bolt 242 and washer 224 are removed from the threaded bore, the oscillating blade 214 has its recesses or openings 212' aligned with the projections 212 on the clamping face 218, and the bolt 242 and washer 224 are reattached to the threaded bore to hold the oscillating blade 214 between the bolt 242 and the clamping face 218. The oscillating blade 214 can be removed by removing the bolt 242 and/or washer 224 from the threaded bore.

Figure 4A:
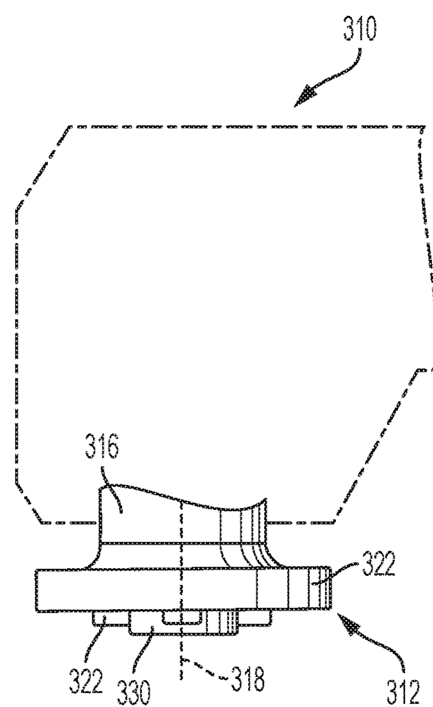
FIG. 4A is a perspective view of another embodiment of an attachment mechanism for an oscillating power tool.
Figure 4B:
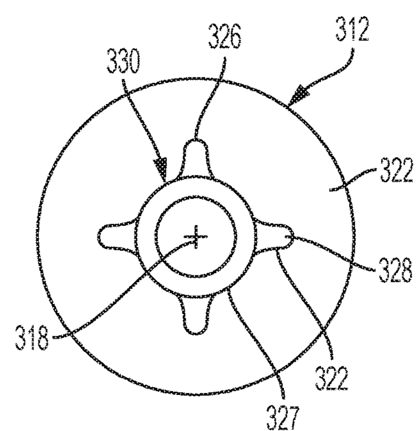
FIG. 4B is a top view of a clamping plate of the attachment mechanism of FIG. 4B.
Figure 6A:
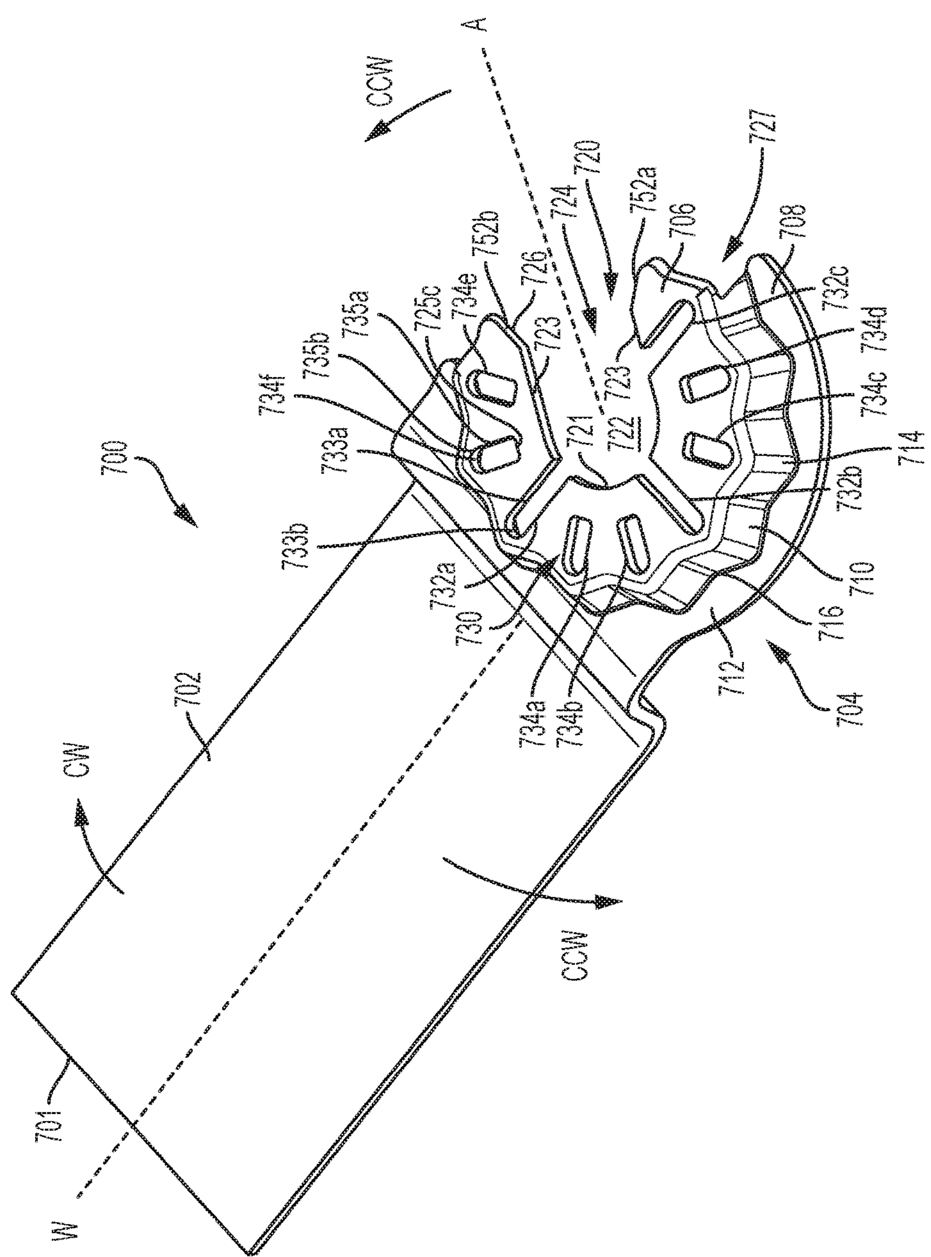
FIG. 6A is a perspective view of an embodiment of an accessory in accordance with the present application.
Figure 6B:
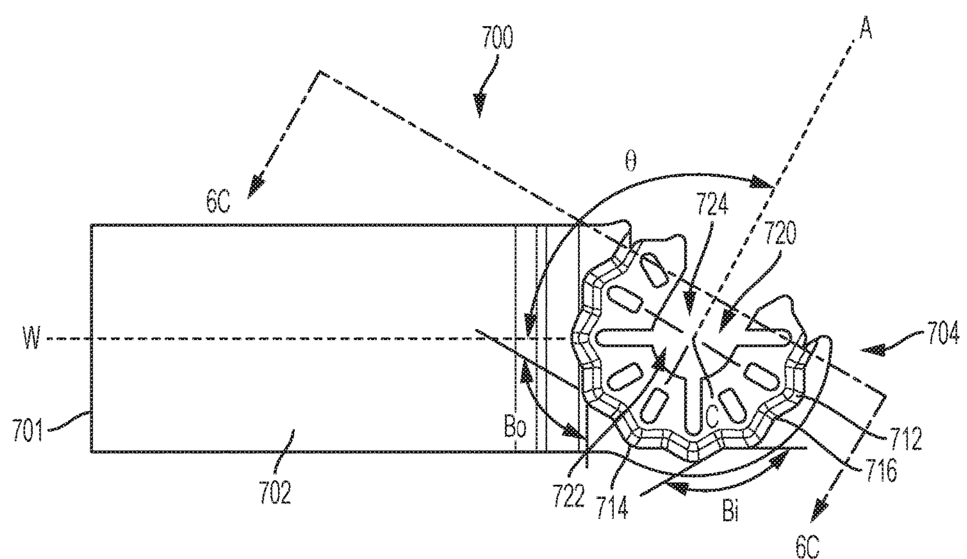
FIG. 6B is a top view of the accessory of FIG. 6A.
Figure 6C:
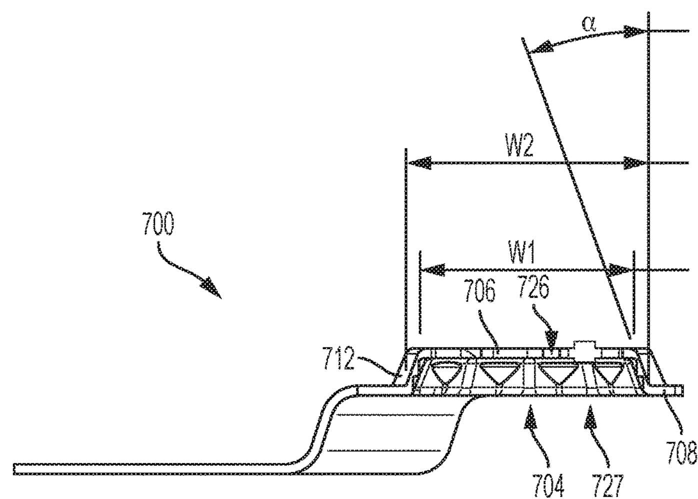
FIG. 6C is a side view partially in section of the accessory of FIG. 6B, taken along line 6B-6B.
Figure 6D:
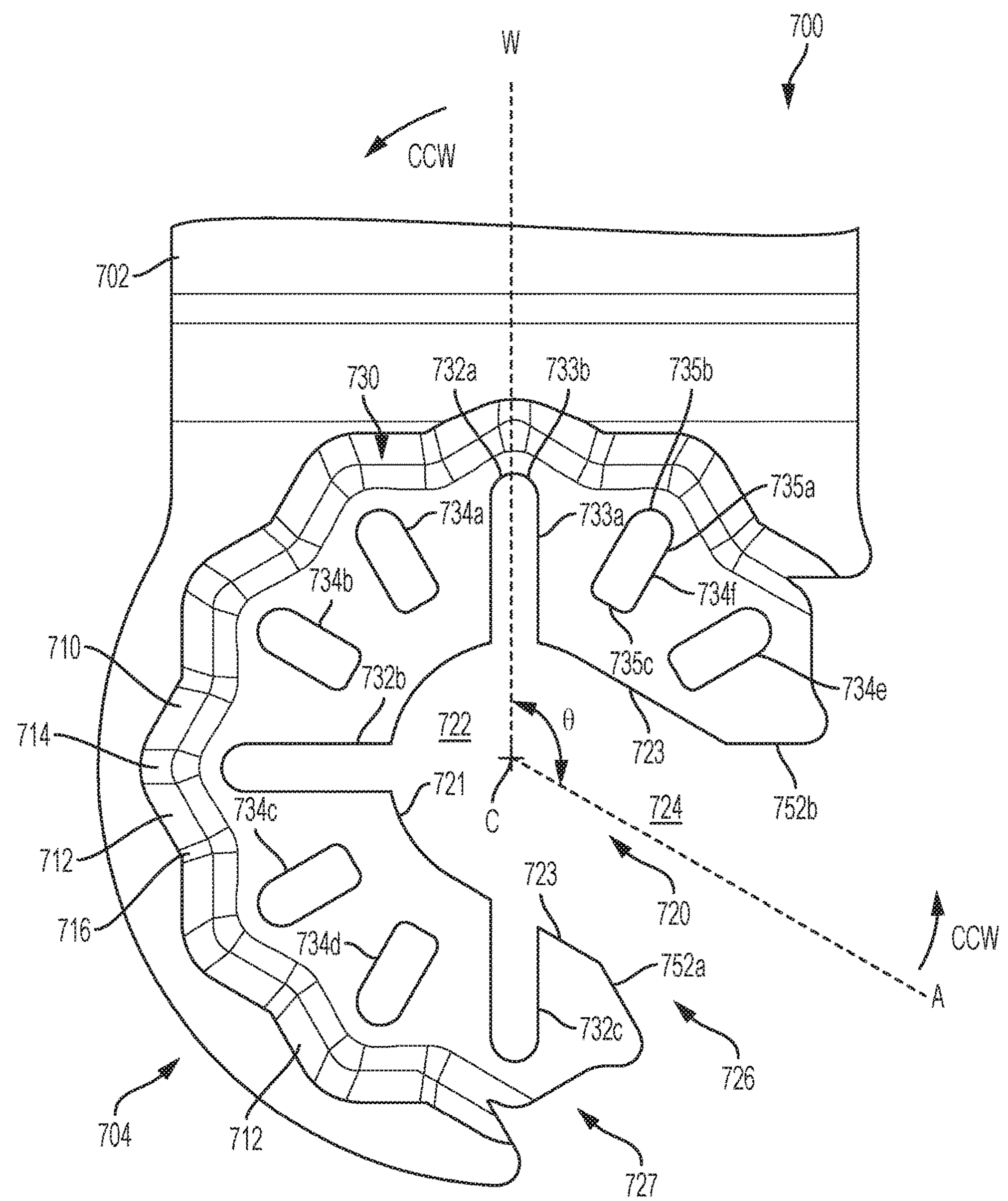
FIG. 6D is a close up top view of the attachment mechanism of the accessory of FIG. 6A.

Referring to FIGS. 4A and 4B, in another embodiment, an oscillating power tool 310 usable with the accessories described in this application Is similar to oscillating power tools sold by Fein® and is described further in U.S. Pat. No. 6,796,888, which is hereby Incorporated by reference. The oscillating power tool 310 includes an accessory attachment mechanism 312 that requires the use of a separate tool such as a screwdriver or wrench to couple a blade to the oscillating power tool. Such an exemplary accessory attachment mechanism 312 includes a clamping face 322 that is fixedly attached to an output spindle 316 extending along an output axis 318. The clamping face 322 is configured to oscillate with the spindle 316, and a threaded bolt 330 that can be removably received (using a separate tool) in a threaded bore (not shown) in the spindle 316 and/or in the clamping face 322. The clamping face 322 includes a plurality of mounting features in the form of radial projections 328 configured to engage with a plurality of corresponding recesses or openings in an oscillating blade or accessory. The projections 328 each may have rounded tips or bulges 326 and may be joined by curved edges 327. To couple an oscillating accessory to the oscillating power tool, the bolt 330 are removed from the threaded bore, the oscillating accessory has its recesses or openings aligned with the projections 328, and the bolt 330 is reattached to the threaded bore to hold the oscillating accessory between the bolt 330 and the clamping face 322. The oscillating accessory can be removed by removing the bolt 330 from the threaded bore.

FIGS. 5A-5F, common accessory attachment mounting features for various different brands of oscillating power tools are illustrated (both the tool and tool-free types). In one aspect, this application discloses embodiments of oscillating accessories that adaptable to be coupled to the accessory attachment mechanisms on more than one of these different types of mounting features.

For example, FIG. 5A illustrates a projection pattern on the clamping face 70 of Porter-Cable® branded oscillating power tools, as illustrated above in FIGS. 1A and 1B. The projection pattern includes eight round projections 78*a*-78*h* arranged clockwise about a central opening 72 at angles of 0, 60, 90, 120, 180, 240, 270, and 300 degrees, respectively, relative to an imaginary vertical line 74 extending from the central hole 72. FIG. 5B illustrates a projection pattern on a clamping face 70' of DEWALT® branded oscillating power tools. The projection pattern Includes eight oblong or rectangular projections 78a'-78h' arranged clockwise about a central opening 72' at angles of 0, 60, 90, 120, 180, 240, 270, and 300 degrees, respectively, relative to an imaginary vertical line 74' extending from the central hole 72'. FIG. 5C illustrates a projection pattern on a clamping face 400 of Mastercraft® branded oscillating power tools (e.g., the Mastercraft® 054-1266-4 oscillating tool), which includes four round projections 400a-400d arranged clockwise about a central circular projection 402 at angles of 0, 90, 180, and 270 degrees, respectively, relative to an imaginary vertical line 404 extending from the central projection 402 through the projection 400a. FIG. 5D illustrates a projection pattern on a clamping face 218 of Dremel®, Bosch®, Milwaukee®, and Skil® branded oscillating power tools (e.g., the Dremel® Multi-Max MM-20 oscillating tool, the Bosch® MX25EC-21 Multi-X oscillating tool, the Milwaukee® 2426-22 oscillating tool, and the Skil® 1400-02 oscillating tool) similar to the Bosch® branded products disclosed above in FIGS. 3A and 3B. This projection pattern includes twelve trapezoidal or oblong projections 212a-212l arranged clockwise every 30 degrees about a central opening 220, relative to an imaginary vertical line 204 extending from the central opening 220 through projection 212a.

FIG. 5E illustrates a projection pattern on a clamping face 322 of Fein® branded oscillating power tools (e.g., the Fein® FMM-250 oscillating tool) similar to the Fein® products disclosed above in FIGS. 4A and 4B. This pattern includes a central, circular projection 327, and four radial projections 328a-328d extending radially outward from the central projection 327 clockwise at angles of 0, 90, 180, and 270 degrees, respectively, relative to an imaginary vertical line 304 extending from the central projection 327 through projection 328a. FIG. 5F illustrates a projection pattern on a clamping face 500 of Craftsman® branded oscillating power tools (e.g., the Craftsman® 2702 oscillating tool), which includes a four radial projections 500a-500d extending radially outward, and arranged clockwise about a central point 502 at angles of 0, 90, 180, and 270 degrees, respectively, relative to an imaginary vertical line 504 extending from the central point 502 through the radial projection 500a. FIG. 5G illustrates a projection pattern on a clamping face 600 of Ridgid® branded oscillating power tools (e.g., the Ridgid® R26800 oscillating tool), which includes a central, circular projection 602, and four radial projections 600a-600d extending radially outward from the central projection 602 clockwise at angles of 0, 90, 180, and 270 degrees, respectively, relative to an imaginary vertical line 604 extending from the central projection 602 through the radial projection 600a. FIG. 5H illustrates a projection pattern on Starlock® branded oscillating power tools similar to the Starlock® products disclosed above in FIGS. 2A and 2B. This pattern includes two radially expandable central legs 104a, 104b that move radially outward along a line L that is parallel to the tool axis. The pattern also includes a peripheral wall 113 with a plurality of sidewalls 109a that together define a star shape (e.g., a 12-point star with outer vertices 115a positioned every 30 degrees about the peripheral wall 113).

Referring to FIGS. 6A-6F, an embodiment of an oscillating accessory 700 according to the present application includes a working end portion 702 and an attachment portion 704. The working end portion 702 defines and extends along a working end axis W and is configured to perform an operation on a workpiece. The working end portion comprises a working end 701 that may comprise, e.g., one or more of a cutting edge, a saw blade, a sanding surface, or an abrading surface.

The attachment portion 704 is coupled to a rear end portion 703 of the working end portion 702 and is configured to be coupled to all of the different configurations of accessory attachment mechanisms on the brands of oscillating power tools described above. The attachment portion 704 includes a top planar wall 706 and a bottom planar wall 708 that are generally parallel to and offset from each other and from the working end portion 702. A peripheral wall 710 extends at least partially around the attachment portion between the top wall 706 and the bottom wall 708 and that has at least a portion of a polygonal shape. For example, the peripheral wall 710 includes a plurality of sidewalls 712, each inclined inward from the bottom wall 708 toward the top wall 706 at an angle $\alpha$ (e.g., an acute angle, such as approximately 20° to 22°) so that the bottom wall 708 is disposed radially outward from the top wall 706. Adjacent sidewalls 712 are also angled relative to one another with adjacent sidewalls joined at outer vertices 714 and inner vertices 716 to form the portion of a star shape. In an embodiment, adjacent sidewalls 712 are angled to each other by alternating inward angles $\beta i$ (e.g., an obtuse angle, such as approximately 149° to 151°) and outward angles $\beta o$ (e.g., an obtuse angle, such as approximately 119° to 121°) and form a portion (e.g., at least 7 points or 9 points) of a 12 point star shape.

The top wall 706 defines a generally U-shaped opening 720 extending along an attachment portion axis A that is at an angle $\theta$ to the working end axis W (e.g., an obtuse angle such as approximately 120° to 150°). The U-shaped opening 720 and its angle $\theta$ relative to the working end axis W is a critical feature of the oscillating accessory for reasons that will become apparent below. The U-shaped opening 720 has a semi-circular central portion 720 bounded by a curved edge 721 at a center C of the attachment portion 704. The U-shaped opening 720 also has a posterior portion 724 extending from the central portion 722 along the attachment portion axis A bounded by straight parallel edges 723 and by radial outward chamfers 725a, 725b and open to a gap 726 in the top wall 706 and a gap 727 in the peripheral wall 712 and the bottom wall 708. It should be noted that the gap 726 in the top wall 706 has a first width w1 that is smaller than a second width 22 of the gap 727 in the peripheral wall 712 and the bottom wall 708. The larger width w2 of the gap 727 in the peripheral wall 712 enables clamping bolts of the aforementioned oscillating power tools to be inserted beneath the top wall 706 without removing the clamping bolt from the oscillating power tool, while the smaller width w1 of the gap 726 in the top wall 706 enables a larger surface area of the top wall 706 to engage the projection pattern on the clamping face of the oscillating power tool.

The top wall 706 also defines a plurality of a radial openings 730 arranged between the U-shaped opening 720 and the peripheral wall 710, each extending in a direction radially outward from the center C of the central portion 722. The plurality of radial openings 730 include a first plurality of radial openings that include three radial arm slots 732a-732c. The radial arm slots 732a-732c are in communication with and extend radially outward from the central portion 722 of the U-shaped opening 720. The radial arm slots 732a-732c are positioned at approximately 0°, 90°, and 180°, respectively, in a counterclockwise direction relative to the working end axis W. If, as shown in the drawings, the attachment portion axis A is at an angle $\theta$ of approximately 150° to the working end axis W, then the radial arm slots 732a-732c are at approximately 120°, 210°, and 330°, respectively, in a counterclockwise direction from the attachment portion axis A. More generally, it can be said that all of the radial arm slots 732*a*-732*c* are either parallel to or perpendicular to the working tool axis W, and are all non-parallel or non-perpendicular to the attachment axis A. Each radial arm slot 732*a*-732*c* has a pair of straight, parallel side edges 733*a* joined by a curved outer edge 733*b* to form a generally oblong shape. However, the radial arm slots can have other configurations such as rectangular or partially oval.

The plurality of radial openings 730 also include a second plurality of radial openings that include a first pair of radial openings 734*a*, 734*b* spaced radially from the central portion 722 and between the first and second radial arm slots 732*a*, 732*b*, a second pair of radial openings 734*c*, 734*d* spaced radially from the central portion 722 and between the second and third radial arm slots 732*b*, 732*c*, and a third pair of radial openings 734*e*, 734*f* spaced radially from the central portion 722 and between the U-shaped opening 720 and the first radial arm slot 732*a*. The radial openings 734*a*-734*f* are positioned at approximately 30°, 60°, 120°, 150°, 300°, and 330°, respectively, in a counterclockwise direction CCW relative to the working end axis W. If, as shown in the drawings, the attachment portion axis A is at an angle θ of approximately 120° to the working end axis W, then the second plurality of radial openings 734*a*-734*f* are at approximately 150°, 180°, 240°, 270°, 60°, and 90°, respectively, in a counterclockwise direction CCW from the attachment portion axis A. More generally, it can be said that all of the second plurality of radial openings 734*a*-734*f* are all non-parallel or non-perpendicular to the working axis W. Each of the second plurality of radial openings 734*a*-734*f* has a pair of straight parallel side edges 735*a* joined by a curved outer edge 735*b* and a straight inner edge 735*c* to form a generally oblong shape. However, the second plurality of radial openings may have a different configuration such as rectangular, round, or oval.

The chamfered edges 725*a*, 725*b* extend outward from the posterior portion 724 of the U-shaped opening 720 in radial directions from the center C of the central portion 722. Each chamfered edge 725*a*, 725*b* extends in a direction in which a radial opening in the top wall 706 would extend if the top wall 706 did not have the gap 726. Chamfered edge 725*a* extends in a direction in which another of the second plurality of radial openings would extend, e.g., at an angle of approximately 210° in a counterclockwise direction CCW relative to the working end axis W. Chamfered edge 725*b* extends in a direction in which another radial arm slot would extend, e.g., at an angle of approximately 270° in a counterclockwise direction CCW relative to the working end axis W. If, as shown in the drawings, the attachment portion axis A is at an angle θ of approximately 150° to the working end axis W, then the chamfers 725*a*, 725*b* are at approximately 300° and 30°, respectively, in a counterclockwise direction CCW from the attachment portion axis A.

FIGS. 7A-7H schematically illustrate how the attachment portion 704 of the accessory 700 is coupled to the clamping mechanisms of the power tools shown in FIGS. 5A-5H with the working end axis W aligned with the power tool housing axis X. As shown in FIGS. 7A and 7B, when the accessory 700 is coupled to a Porter-Cable® or a DEWALT® branded power tool, the central portion 722 of the U-shaped opening 720 receives the support post 72, 72' of the power tool, the first set of radial arm slots 732*a*, 734*b*, 734*c* receive the projections 78*a*, 78*g*, 78*e*, 78*a*', 78*g*', 78*e*', the second radial openings 734*b*, 734*c*, 734*e*, receive the projections 78*h*, 78*f*, 78*b*, 78*h*', 78*f*', 78*b*', and the chamfer 725*b* provides clearance for and abuts the projections 78*c*, 78*c*'. As shown in FIG. 7C, when the accessory 700 is coupled to a Mastercraft® branded power tool, the central portion 722 of the U-shaped opening 720 receives the central projection 402 of the power tool, the first set of radial arm slots 732*a*, 732*b*, 732*c* receive the round projections 400*a*, 400*d*, 400*c* of the power tool, and the chamfer 725*b* provides clearance for and abuts the round projection 400*b*.

As shown in FIG. 7D, when the accessory 700 is coupled to a Dremel®, Bosch®, Milwaukee®, or Skil® branded oscillating power tools, the central portion 722 of the U-shaped opening 720 receives the central projection 220 of the power tool, the radial arm slots 732*a*-732*c* and the second radial openings 734*a*-734*f* together receive the oblong or trapezoidal projections 212*a*-212*c* and 212*g*-212*l*, and the chamfers 725*a*, 725*b* provide clearance for and abut projections 212*d*, 212*f*. As shown in FIG. 7E, when the accessory is coupled to a Fein® branded oscillating power tool, the central portion 722 of the U-shaped opening 720 receives the central projection 327, the first set of radial arm slots 732*a*, 732*b*, 732*c* receive the radial projections 328*a*, 328*c*, 328*d*, and the chamfer 725*b* provides clearance for and abuts the radial projection 328*b*. As shown in FIG. 7F, when the accessory is coupled to a Craftsman® branded oscillating power tool, the first set of radial arm slots 732*a*, 732*b*, 732*c* receive the radial projections 500*a*, 500*c*, 500*d*, and the chamfer 725*b* provides clearance for and abuts the radial projection 500*b*. As shown in FIG. 7G, when the accessory is coupled to a Ridgid® branded oscillating power tool, the central portion 722 of the U-shaped opening 720 receives the central projection 602, the first set of radial arm slots 732*a*, 732*b*, 732*c* receive the radial projections 600*a*, 600*c*, 600*d*, and the chamfer 725*b* provides clearance for and abuts the radial projection 600*b*.

As shown in FIG. 7H, when the accessory 700 is coupled to a Starlock® branded oscillating power tool, the central portion 722 of the U-shaped opening receives the radially expandable legs 104*a*, 104*b* of the power tool with each of the legs 104*a*, 104*b* engaging at least a portion of the top wall 706 of the accessory 700 when the legs 104*a*, 104*b* are expanded. In addition, the at least partially star-shaped peripheral wall 710 of the accessory is received in the star-shaped peripheral wall 113 of the power tool with a majority of the sidewalls 712, outer vertices 714, and inner vertices 716 of the accessory 700 engaging the sidewalls 109*a*, outer vertices 115*a*, and inner vertices 115*b* of the power tool.

FIGS. 7A-7H illustrate that the accessory 700 is universal insofar as it can be coupled to virtually all major existing brands of oscillating power tools. FIGS. 7A-7H show the accessory 700 being coupled to the oscillating power tools with the working end axis W of the accessory generally aligned with or parallel to the axis X of the power tool housing. However, it will be understood to one of ordinary skill in the art that the accessory 700 may be rotated and coupled to the power tools so that the working end axis W is at various other angles relative to the power tool axis X. The power tools shown in FIGS. 7A-7D and 7H enable the accessory 700 to be coupled to the power tool at 30° Increments, while the power tools shown in FIGS. 7E-7G enable the accessory 700 to be coupled to the power tool at 90° increments relative to the tool housing axis X.

Figure 8C:
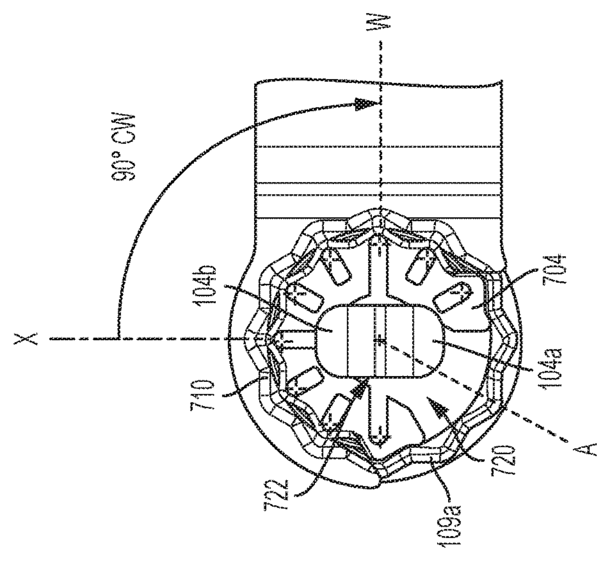
FIGS. 8A-8C are schematic views showing coupling of the accessory of FIGS. 6A-6D in several rotational positions to the attachment mechanism of the oscillating power tool of FIGS. 2A-2B and 5H.
Figure 8B:
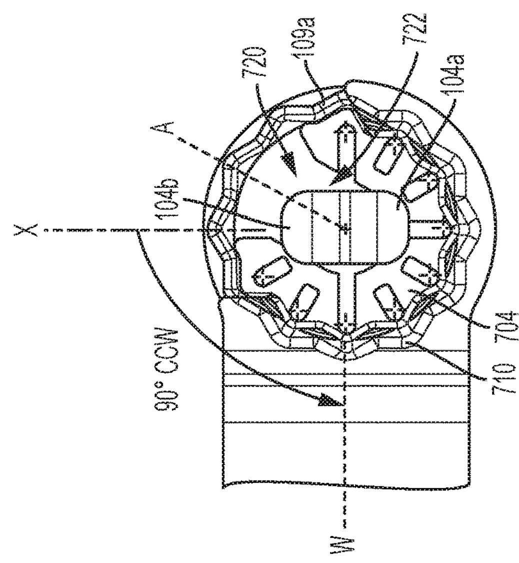
Figure 8A:
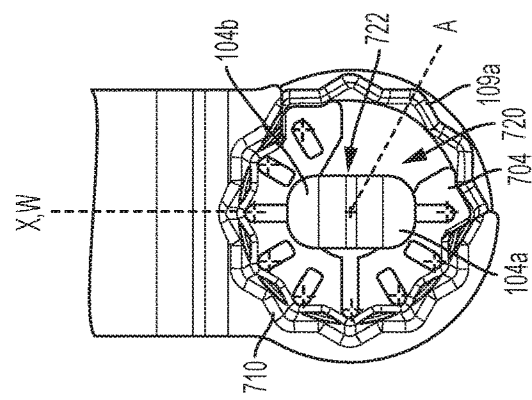

Referring to FIGS. 8A-8C, when being coupled to the Starlock® branded oscillating power tools shown in FIGS. 2A-2B, 5H, and 7H, the angle of the attachment axis A of the U-shaped slot 720 relative to the working axis W is a critical feature of the accessory 700. Through extensive research, the inventors determined that oscillating power tool accessories are most often used (e.g., approximately 90% of the time) with the working axis W aligned or parallel with the tool housing axis X or perpendicular to the tool housing axis X, with the aligned or parallel position being the most common of these three positions. Therefore, the U-shaped slot 720 has been designed so that the accessory 700 may be tightly retained in the attachment mechanism 110 of the power tool when the accessory 700 is positioned at these angles. In the Starlock® power tools, the radially expandable legs 104*a*, 104*b* provide most of the axial retention of the accessory in the attachment mechanism 110. The accessory 700 is most tightly retained if both of the radially expandable legs 104*a*, 104*b* are able to engage the top wall 706 of the accessory 700. As shown in FIGS. 8A-8C, by placing the attachment axis A of the U-shaped slot 720 at an obtuse angle (e.g., approximately 120° to 150°) relative to the working axis W, both legs 104*a*, 104*b* engage at least a portion of the top wall 704 when the working axis W is aligned with the tool axis X (FIG. 8A), at 90° counterclockwise from the tool axis X (FIG. 8B), and at 90° clockwise from the tool axis X (FIG. 8C). In contrast, if the attachment axis A of the U-shaped slot was aligned with the working axis W (as is common on existing oscillating tool accessories), then one of the legs 104*b* would not engage the top wall 704 with the accessory 700 positioned in its most commonly used position, with the working axis W aligned with the power tool axis X. Thus, the angle of the attachment axis A of the U-shaped slot is a critical feature of the accessory 700.

Figure 9:
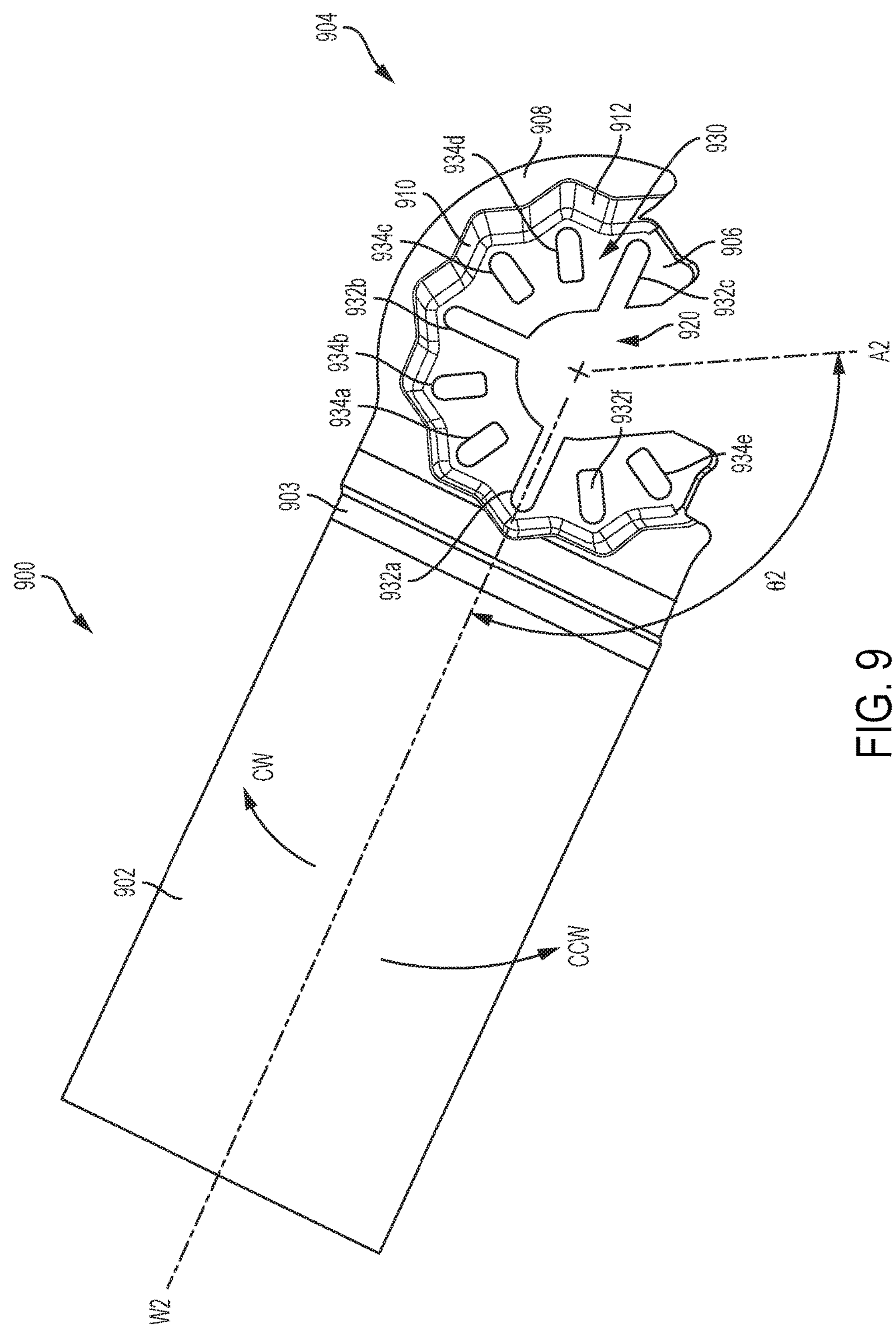
FIG. 9 is a top view of another embodiment of an accessory in accordance with the present application.

Referring to FIG. 9, another embodiment of an oscillating accessory 900 according to the present application includes a working end portion 902 and an attachment portion 904, similar to the working end portion 702 and the attachment portion 704 of the accessory 700 shown in FIGS. 6A-8C. The working end portion 902 defines and extends along a working end axis W2 and is configured to perform an operation on a workpiece. The attachment portion 904 is coupled to a rear end portion 903 of the working end portion 902 and is configured to be coupled to all of the different configurations of accessory attachment mechanisms on the brands of oscillating power tools described above. Like the attachment portion 704, the attachment portion 904 includes a top planar wall 906, a generally parallel bottom planar wall 908, and a peripheral wall 910 that extends at least partially around the attachment portion 904 between the top wall 906 and the bottom wall 908 and that forms at least a portion of a polygonal shape. For example, peripheral wall 910 includes a plurality of sidewalls 912 having a similar at least partially star shaped configuration as the side walls 712 of the peripheral wall 710. The top wall 906 defines a generally U-shaped opening 920, similar to the U-shaped opening 720, extending along an attachment portion axis A2 that is at an angle θ2 to the working end axis W2 (e.g., an obtuse angle such as approximately 120° to 150°). The top wall 906 also defines a plurality of a radial openings 930 comprising three radial arm slots 932*a*-932*c* (similar to radial arm slots 732*a*-732*c*) in communication with and extending radially outward from the U-shaped opening 920, and a second plurality of radial openings 934*a*-934*f* (similar to radial openings 734*a*-734*f*) spaced radially from the central U-shaped opening 920.

The oscillating accessory 900 differs from the oscillating accessory 700 insofar as the openings in the attachment portion 904 are a mirror image of the openings in the attachment portion 704. In the attachment portion 704, the attachment axis A extends at an angle θ in a clockwise direction CW from the working axis W, while in the attachment portion 904, the attachment axis A2 extends at an angle θ2 in a counterclockwise direction CCW from the working axis W2. Similarly, in the attachment portion 704, the radial arm slots 732*a*-732*c* and the second plurality of openings 734*a*-734*f* are numbered consecutively in a counterclockwise direction CCW from the working axis W, while in the attachment portion 904, the radial arm slots 932*a*-932*c* and the second plurality of openings 934*a*-934*f* are numbered consecutively in a clockwise direction CW from the working axis W2.

Since the attachment portion 904 is simply a mirror image of the attachment portion 704, the accessory 900 is universal and can be coupled to all of the oscillating power tools, as shown in FIGS. 5A-5H, with the coupling being a mirror image of the couplings shown in FIGS. 7A-7H. In addition, like the accessory 700, the accessory 900 may be rotated and coupled to the power tools so that the working end axis W is at various other angles relative to the power tool axis X (e.g., the power tools shown in FIGS. 5A-5D and 5H enable the accessory 900 to be coupled to the power tool at 30° increments, while the power tools shown in FIGS. 5E-5G enable the accessory 900 to be coupled to the power tool at 90° increments relative to the tool housing axis X). In addition, because the attachment axis A2 of the U-shaped slot 920 is at an obtuse angle (e.g., approximately 120° to 150°) relative to the working axis W2, the accessory 900 can be tightly retained in Starlock® branded oscillating power tools when the working axis W2 is aligned with or perpendicular to the tool housing axis X, since both legs 104*a*, 104*b* of the power tool will engage at least a portion of the top wall 904 in these positions, as shown in FIGS. 8A-8C.

Figure 10:
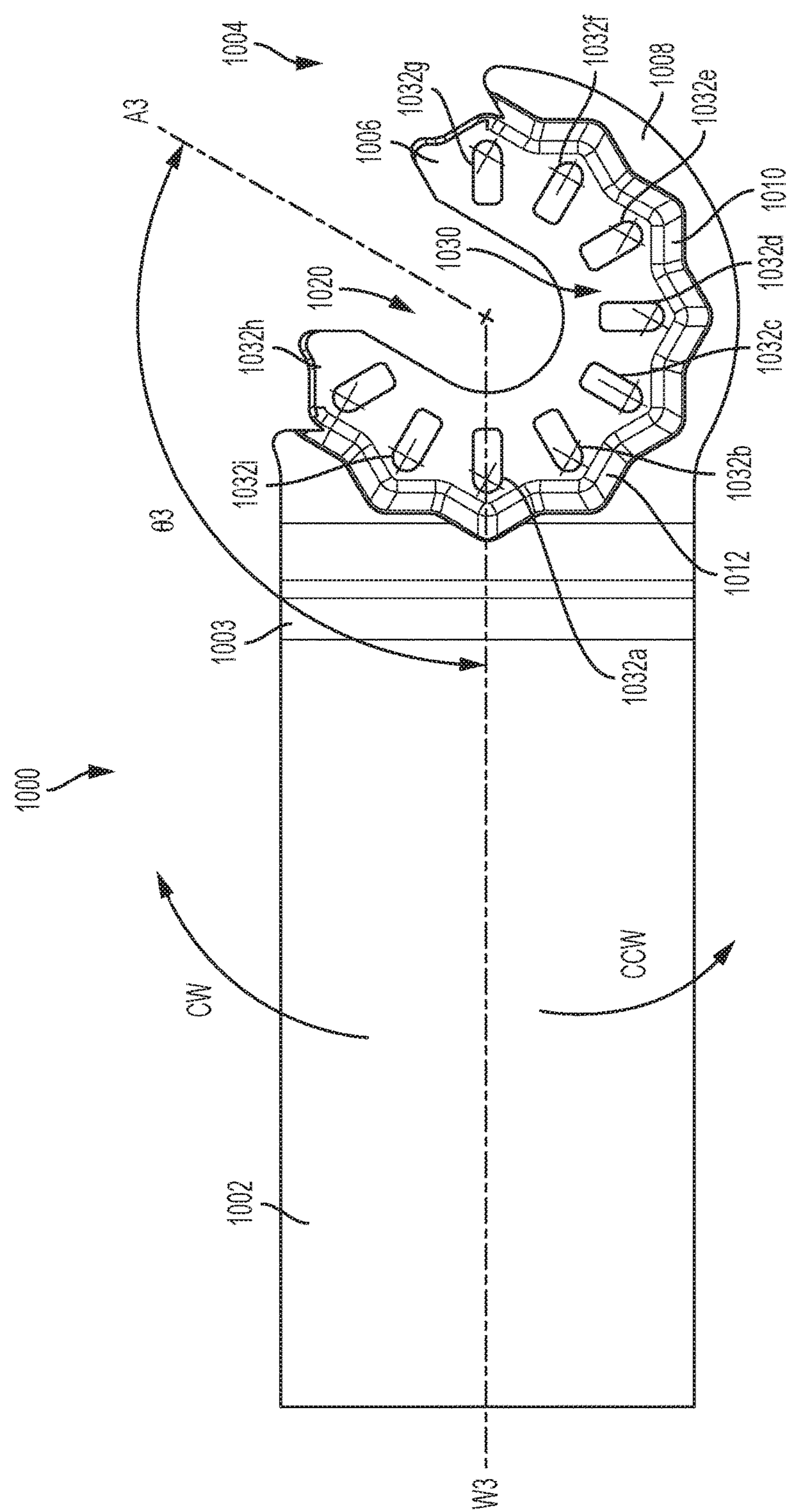
FIG. 10 is a top view of another embodiment of an accessory in accordance with the present application.

Referring to FIG. 10, another embodiment of an oscillating accessory 1000 according to the present application includes a working end portion 1002 and an attachment portion 1004, similar to the working end portion 702 and the attachment portion 704 of the accessory 700 shown in FIGS. 6A-8C. The working end portion 1002 defines and extends along a working end axis W3 and is configured to perform an operation on a workpiece. The attachment portion 1004 is coupled to a rear end portion 1003 of the working end portion 1002 and is configured to be coupled to a plurality of different configurations of accessory attachment mechanisms on brands of oscillating power tools described above. Like the attachment portion 704, the attachment portion 1004 includes a top planar wall 1006, a generally parallel bottom planar wall 1008, and a peripheral wall 1010 that extends at least partially around the attachment portion 1004 between the top wall 1006 and the bottom wall 1008 and that forms at least a portion of a polygonal shape. For example, the peripheral wall 1010 includes a plurality of sidewalls 1012 having a similar at least partially star shaped configuration as the side walls 712 of the peripheral wall 710. The top wall 1006 defines a generally U-shaped opening 1020, similar to the U-shaped opening 720, extending along an attachment portion axis A3 that is at an angle θ3 to the working end axis W3 (e.g., an obtuse angle such as approximately 120° to 150°) in a clockwise direction CW from the working axis W3. The top wall 1006 also defines a plurality of a radial openings 1030 similar to radial openings 730.

The oscillating accessory 1000 differs from the oscillating accessory 700 insofar as all of the radial openings 1032*a*-1032*i* in the plurality of radial openings 1030 are spaced radially from the central U-shaped opening 1020, similar to the second plurality of radial openings 734*a*-734*f* in the accessory 700. None of the radial openings 1032*a*-1032*i* are in communication with the U-shaped opening 1020, in contrast to the radial arm slots 732*a*-732*c* in the accessory 700. The radial openings 1032*a*-1032*i* are evenly spaced about a circumference of the top wall 1006 (e.g., approximately every 30° about the top wall 1006), and are numbered in a counterclockwise direction CCW from the working axis W3.

The accessory 1000 is somewhat less universal than the accessories 700, 900 described above. The accessory 1000 can be coupled to the oscillating power tools shown in FIGS. 5A-5D because the radial openings can receive the projections 78*a*-78*h*, 78*a*'-78*h*', 400*a*-400*d*, and 212*a*-212*l* of these power tools. The accessory 1000 also can be coupled to the oscillating power tool shown in FIG. 5H because the U-shaped opening 1020 can receive the legs 104*a*, 104*b*, and the star shaped peripheral wall 1010 can be received in the star-shaped wall 113 of the power tool. However, the accessory 1000 cannot be coupled to the oscillating power tools shown in FIGS. 5E-5G because none of the radial openings 1032*a*-1032*i* are in communication with the U-shaped opening 1020 such that the radial openings 1032*a*-1032*i* cannot receive all of the radial projections 328*a*-328*d*, 500*a*-500*d*, and 600*a*-600*d*. For the power tools shown in FIGS. 5A-5D and 5H, like the accessory 1000 may be rotated and coupled to the power tools so that the working end axis W is at various other angles relative to the power tool axis X (e.g., the at 30° increments). Finally, because the attachment axis A3 of the U-shaped slot 1020 is at a similar obtuse angle (e.g., approximately 120° to 150°) as the attachment axis A relative to the working axis W3, the accessory 1000 can be tightly retained in Starlock® branded oscillating power tools when the working axis W3 is aligned with or perpendicular to the tool housing axis X, since both legs 104*a*, 104*b* of the power tool will engage at least a portion of the top wall 1004 in these positions, as shown in FIGS. 8A-8C.

Figure 11:
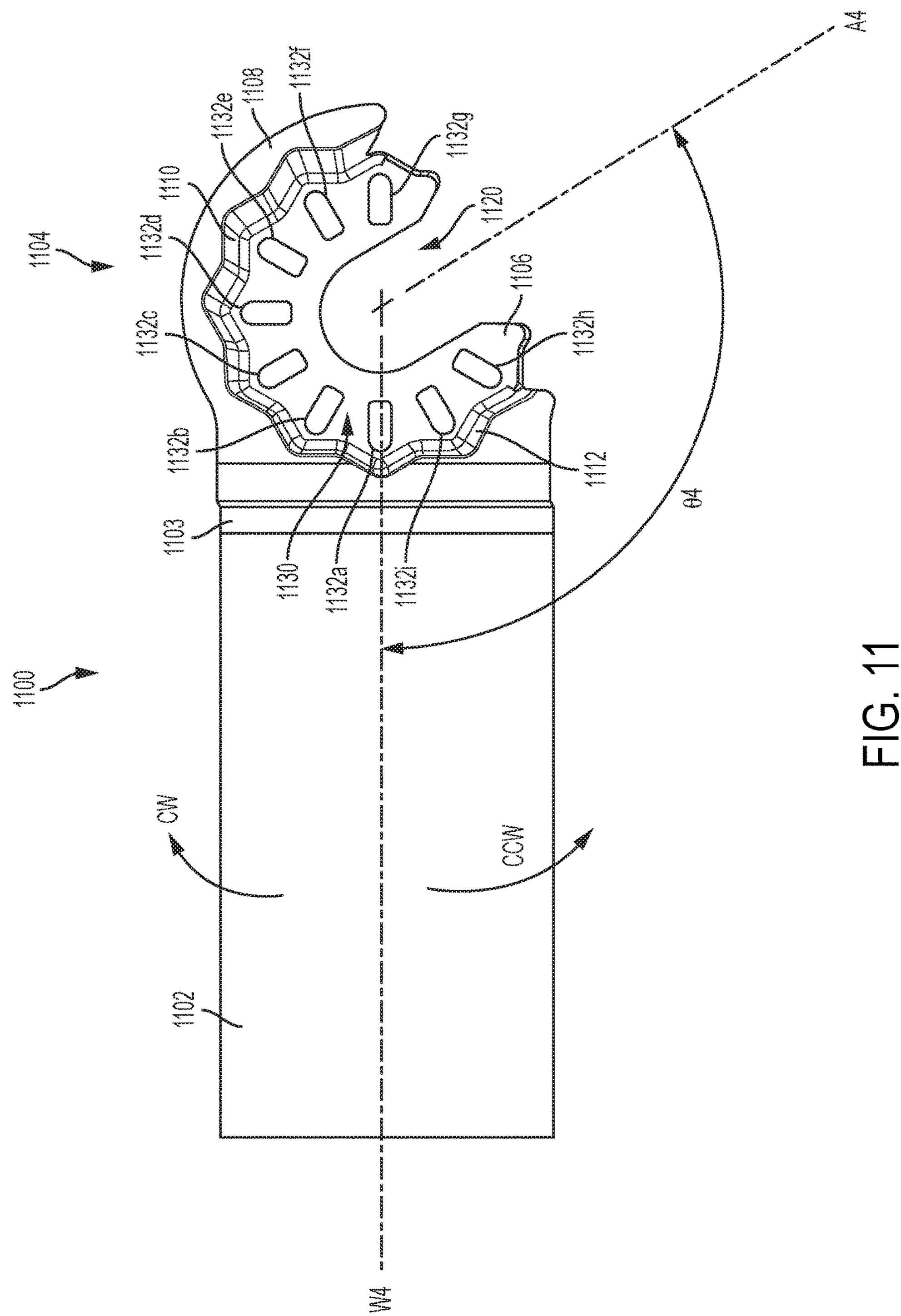
FIG. 11 is a top view of another embodiment of an accessory in accordance with the present application.

Referring to FIG. 11, another embodiment of an oscillating accessory 1100 according to the present application includes a working end portion 1102 and an attachment portion 1104, similar to the working end portion 1002 and the attachment portion 1004 of the accessory 1000 shown in FIG. 10. The working end portion 1102 defines and extends along a working end axis W4 and is configured to perform an operation on a workpiece. The attachment portion 1104 is coupled to a rear end portion 1103 of the working end portion 1102 and is configured to be coupled to a plurality of different configurations of accessory attachment mechanisms on brands of oscillating power tools described above. Like the attachment portion 1004, the attachment portion 1104 includes a top planar wall 1106, a generally parallel bottom planar wall 1108, and a peripheral wall 1110 that extends at least partially around the attachment portion 1104 between the top wall 1106 and the bottom wall 1108 and that forms at least a portion of a polygonal shape. For example, the peripheral wall 1110 includes a plurality of sidewalls 1112 having a similar at least partially star shaped configuration as the side walls 1012 of the peripheral wall 1010. The top wall 1106 defines a generally U-shaped opening 1120, similar to the U-shaped opening 1020, extending along an attachment portion axis A4 that is at an angle θ4 to the working end axis W4 (e.g., an obtuse angle such as approximately 120° to 150°) in a counterclockwise direction CCW from the working axis W4. The top wall 1106 also defines a plurality of a radial openings 1130 that include radial openings 1132*a*-1132*i* spaced radially from the central U-shaped opening 1120, similar to radial openings 1032*a*-1032*i* in the accessory 1000.

The oscillating accessory 1100 differs from the oscillating accessory 1000 insofar as the openings in the attachment portion 1104 are a mirror image of the openings in the attachment portion 1004. In the attachment portion 1004, the attachment axis A3 extends at an angle θ3 in a clockwise direction CW from the working axis W3, while in the attachment portion 1104, the attachment axis A4 extends at an angle θ4 in a counterclockwise direction CCW from the working axis W4. Similarly, in the attachment portion 1004, the plurality of openings 1032*a*-1032*i* are numbered consecutively in a counterclockwise direction CCW from the working axis W3, while in the attachment portion 1104, the plurality of openings 1032*a*-1032*i* are numbered consecutively in a clockwise direction CW from the working axis W4.

Since the attachment portion 1104 is simply a mirror image of the attachment portion 1004, the accessory 1100 is similarly somewhat less universal than the accessories 700, 900 described above. The accessory 1100 can be coupled to the oscillating power tools shown in FIGS. 5A-5D because the radial openings can receive the projections 78*a*-78*h*, 78*a*'-78*h*', 400*a*-400*d*, and 212*a*-212*l* of these power tools. The accessory 1100 also can be coupled to the oscillating power tool shown in FIG. 5H because the U-shaped opening 1120 can receive the legs 104*a*, 104*b*, and the star shaped peripheral wall 1110 can be received in the star-shaped wall 113 of the power tool. However, the accessory 1100 cannot be coupled to the oscillating power tools shown in FIGS. 5E-5G because none of the radial openings 1132*a*-1132*i* are in communication with the U-shaped opening 1020 such that the radial openings 1132*i*-1132*i* cannot receive all of the radial projections 328*a*-328*d*, 500*a*-500*d*, and 600*a*-600*d*. For the power tools shown in FIGS. 5A-5D and 5H, like the accessory 1100 may be rotated and coupled to the power tools so that the working end axis W4 is at various other angles relative to the power tool axis X (e.g., the at 30° increments). Finally, because the attachment axis A4 of the U-shaped slot 1120 is at an obtuse angle (e.g., approximately 120° to 150°) relative to the working axis W4, the accessory 1100 can be tightly retained in Starlock® branded oscillating power tools when the working axis W4 is aligned with or perpendicular to the tool housing axis X, since both legs 104*a*, 104*b* of the power tool will engage at least a portion of the top wall 1104 in these positions, as shown in FIGS. 8A-8C.

Figure 12A:
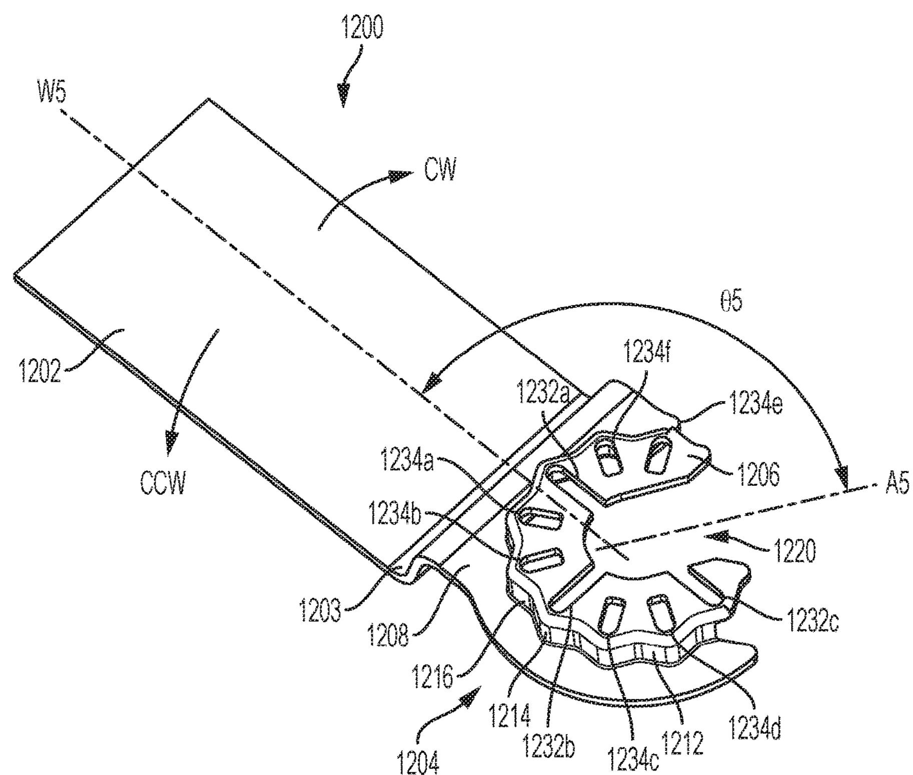
FIGS. 12A and 12B are perspective and side views of another embodiment of an accessory in accordance with the present application.
Figure 12B:
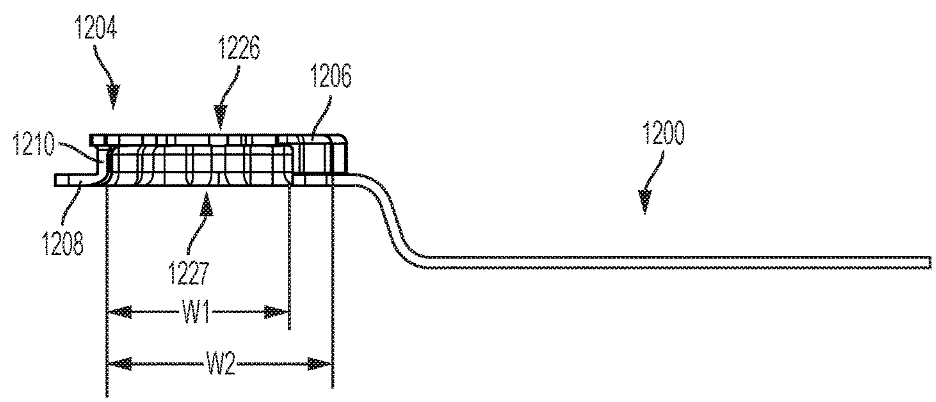

Referring to FIGS. 12A and 12B, another embodiment of an oscillating accessory 1200 according to the present application includes a working end portion 1202 and an attachment portion 1204, similar to the working end portion 702 and the attachment portion 704 of the accessory 700 shown in FIGS. 6A-8C. The working end portion 1202 defines and extends along a working end axis W5 and is configured to perform an operation on a workpiece. The attachment portion 1204 is coupled to a rear end portion 1203 of the working end portion 1202 and is configured to be coupled to all of the different configurations of accessory attachment mechanisms on the brands of oscillating power tools described above. Like the attachment portion 704, the attachment portion 1204 includes a top planar wall 1206, a generally parallel bottom planar wall 1208, and a peripheral wall 1210 that extends at least partially around the attachment portion 1204 between the top wall 1206 and the bottom wall 1208 and that forms at least a portion of a polygonal shape. The top wall 1206 defines a generally U-shaped opening 1220, similar to the U-shaped opening 720, extending along an attachment portion axis A5 that is at an angle θ5 in a clockwise direction CW to the working end axis W5 (e.g., an obtuse angle such as approximately 120° to 150°). The top wall 1206 also defines a plurality of a radial openings comprising three radial arm slots 1232*a*-1232*c* (similar to radial arm slots 732*a*-732*c*) in communication with and extending radially outward from the U-shaped opening 1220, and a second plurality of radial openings 1234*a*-1234*f* (similar to radial openings 734*a*-734*f*) spaced radially from the central U-shaped opening 1220.

For example, the peripheral wall 1210 includes a plurality of sidewalls 1212, similar to sidewalls 712, which are angled relative to one another with adjacent sidewalls joined at outer vertices 1214 and inner vertices 1216 to form the portion of a star shape. For example, the sidewalls 1212 may form a portion (e.g., at least 7 points or 9 points) of a 12 point star shape. The top wall 1206 has a first gap 1226, similar to gap 726, and the peripheral wall 1212 has a second gap 1227, similar to gap 727, with the first gap 1226 having a first width w1 that is smaller than a second width w2 of the second gap 1227, to enable clamping bolts of the aforementioned oscillating power tools to be inserted beneath the top wall 1206 without removing the clamping bolt from the oscillating power tool. The oscillating accessory 1200 differs from the oscillating accessory 700 insofar as the sidewalls 1212 are not inclined inward from the bottom wall 1208 toward the top wall 1206 at an angle, but instead are substantially perpendicular to both the top wall 1206 and the bottom wall 1208, as shown in FIG. 12B.

Figure 13A:
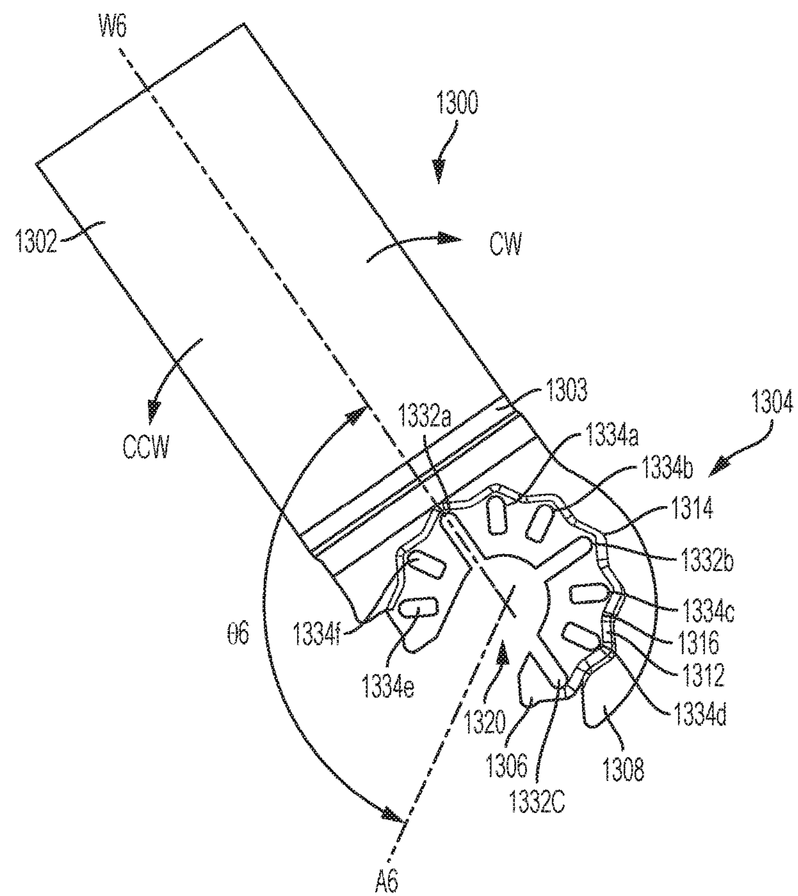
FIGS. 13A and 13B are perspective and side views of another embodiment of an accessory in accordance with the present application.
Figure 13B:
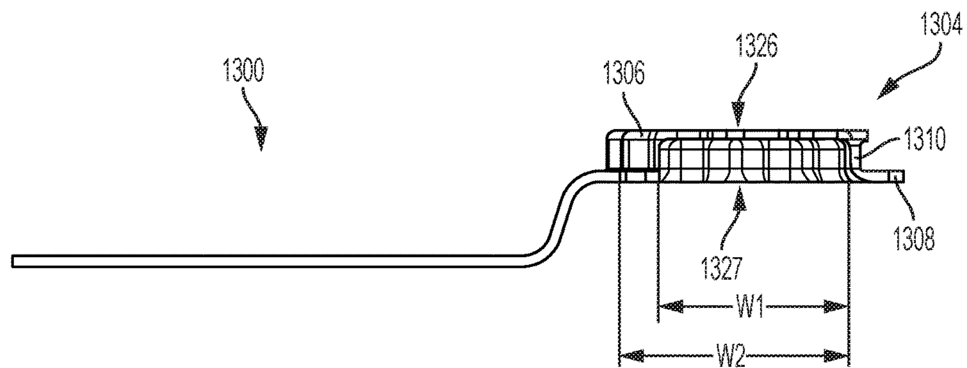

Referring to FIGS. 13A and 13B, another embodiment of an oscillating accessory 1300 according to the present application includes a working end portion 1302 and an attachment portion 1304, similar to the working end portion 1202 and the attachment portion 1204 of the accessory 1200 shown in FIGS. 12A and 12B. The working end portion 1302 defines and extends along a working end axis W6 and is configured to perform an operation on a workpiece. The attachment portion 1304 is coupled to a rear end portion 1303 of the working end portion 1302 and is configured to be coupled to all of the different configurations of accessory attachment mechanisms on the brands of oscillating power tools described above. Like the attachment portion 1204, the attachment portion 1304 includes a top planar wall 1306, a generally parallel bottom planar wall 1308, and a peripheral wall 1310 that extends at least partially around the attachment portion 1304 between the top wall 1306 and the bottom wall 1308 and that forms at least a portion of a polygonal shape. The top wall 1306 defines a generally U-shaped opening 1320, similar to the U-shaped opening 1220, extending along an attachment portion axis A6 that is at an angle θ6 in a counter-clockwise direction CCW to the working end axis W6 (e.g., an obtuse angle such as approximately 120° to 150°). The top wall 1306 also defines a plurality of a radial openings comprising three radial arm slots 1332*a*-1332*c* (similar to radial arm slots 1232*a*-1232*c*) in communication with and extending radially outward from the U-shaped opening 1220, and a second plurality of radial openings 1334*a*-1334*f* (similar to radial openings 1234*a*-1234*f*) spaced radially from the central U-shaped opening 1320.

For example, the peripheral wall 1310 includes a plurality of sidewalls 1312, similar to sidewalls 1212, which are angled relative to one another with adjacent sidewalls joined at outer vertices 1314 and inner vertices 1316 to form the portion of a star shape. For example, the sidewalls 1212 may form a portion (e.g., at least 7 points or 9 points) of a 12 point star shape. The top wall 1306 has a first gap 1326, similar to gap 1226, and the peripheral wall 1312 has a second gap 1327, similar to gap 1227, with the first gap 1326 having a first width w1 that is smaller than a second width w2 of the second gap 1327, to enable clamping bolts of the aforementioned oscillating power tools to be inserted beneath the top wall 1306 without removing the clamping bolt from the oscillating power tool. Like the sidewalls 1212, the sidewalls 1312 are not inclined inward from the bottom wall 1308 toward the top wall 1306 at an angle, but instead are substantially perpendicular to both the top wall 1306 and the bottom wall 1308, as shown in FIG. 13B.

The oscillating accessory 1300 differs from the oscillating accessory 1200 insofar as the openings in the attachment portion 1304 are a mirror image of the openings in the attachment portion 1204. In the attachment portion 1204, the attachment axis A5 extends at an angle θ in a clockwise direction CW from the working axis W, while in the attachment portion 1304, the attachment axis A6 extends at an angle θ6 in a counterclockwise direction CCW from the working axis W6. Similarly, in the attachment portion 1204, the radial arm slots 1232*a*-1232*c* and the second plurality of openings 1234*a*-1234*f* are numbered consecutively in a counterclockwise direction CCW from the working axis W5, while in the attachment portion 1304, the radial arm slots 1332*a*-1332*c* and the second plurality of openings 1334*a*-1334*f* are numbered consecutively in a clockwise direction CCW from the working axis W6.

Figure 14A:
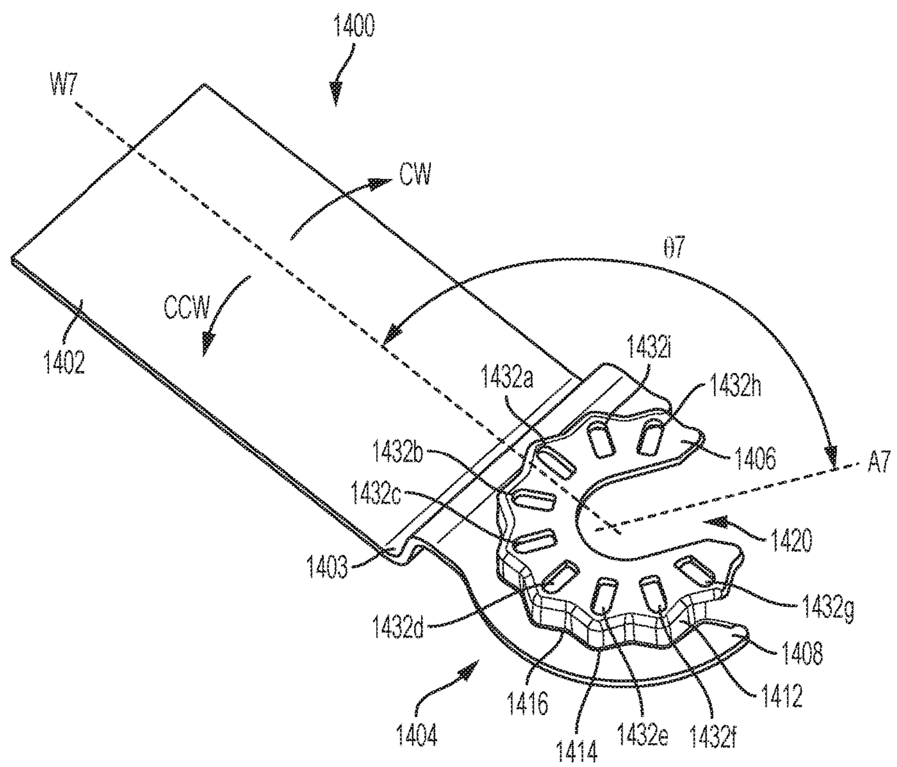
FIGS. 14A and 14B are perspective and side views of another embodiment of an accessory in accordance with the present application.

Referring to FIG. 14, another embodiment of an oscillating accessory 1400 according to the present application includes a working end portion 1402 and an attachment portion 1404, similar to the working end portion 1002 and the attachment portion 1004 of the accessory 700 shown in FIG. 10. The working end portion 1402 defines and extends along a working end axis W7 and is configured to perform an operation on a workpiece. The attachment portion 1404 is coupled to a rear end portion 1403 of the working end portion 1402 and is configured to be coupled to a plurality of different configurations of accessory attachment mechanisms on brands of oscillating power tools described above. Like the attachment portion 1004, the attachment portion 1404 includes a top planar wall 1406, a generally parallel bottom planar wall 1408, and a peripheral wall 1410 that extends at least partially around the attachment portion 1404 between the top wall 1406 and the bottom wall 1408 and that forms at least a portion of a polygonal shape. The top wall 1406 defines a generally U-shaped opening 1420, similar to the U-shaped opening 1020, extending along an attachment portion axis A7 that is at an angle θ7 to the working end axis W7 (e.g., an obtuse angle such as approximately 120° to 150°) in a clockwise direction CW from the working axis W7.

The top wall 1406 defines a plurality of a radial openings 1432*a*-1432*i*, similar to radial openings 1032*a*-1032*i*, with all of the radial openings 1432*a*-1432*i* spaced radially from the central U-shaped opening 1420 and with none of the radial openings 1432*a*-1432*i* in communication with the U-shaped opening 1420. The radial openings 1432*a*-1432*i* are evenly spaced about a circumference of the top wall 1406 (e.g., approximately every 30° about the top wall 1406), and are numbered in a counterclockwise direction CCW from the working axis W7.

Figure 14B:
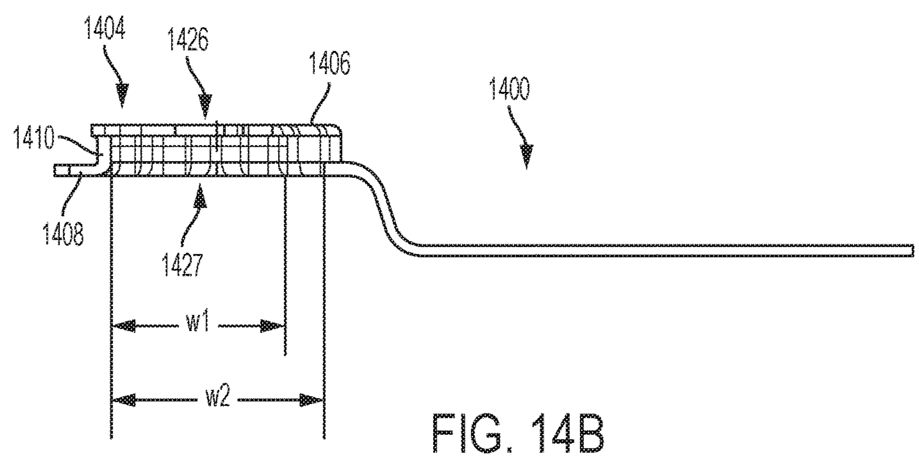

For example, the peripheral wall 1410 includes a plurality of sidewalls 1412, similar to sidewalls 1012, which are angled relative to one another with adjacent sidewalls joined at outer vertices 1414 and inner vertices 1416 to form a portion of a star shape. For example, the sidewalls 1412 may form a portion (e.g., at least 7 points or 9 points) of a 12 point star shape. The top wall 1406 has a first gap 1426 and the peripheral wall 1412 has a second gap 1427 with the first gap 1426 having a first width w1 that is smaller than a second width w2 of the second gap 1427, to enable clamping bolts of the aforementioned oscillating power tools to be inserted beneath the top wall 1206 without removing the clamping bolt from the oscillating power tool. The oscillating accessory 1400 differs from the oscillating accessory 1000 insofar as the sidewalls 1412 are not inclined inward from the bottom wall 1408 toward the top wall 1406 at an angle, but instead are substantially perpendicular to both the top wall 1406 and the bottom wall 1408, as shown in FIG. 14B.

Like the accessory 1000, the accessory 1400 is somewhat less universal than the accessories 700, 900, 1200, 1300 described above. The accessory 1400 can be coupled to the oscillating power tools shown in FIGS. 5A-5D because the radial openings 1432*a*-1432*i* can receive the projections 78*a*-78*h*, 78*a*'-78*h*', 400*a*-400*d*, and 212*a*-212*l* of these power tools. The accessory 1400 also can be coupled to the oscillating power tool shown in FIG. 5H because the U-shaped opening 1420 can receive the legs 104*a*, 104*b*, and the at least partially star shaped peripheral wall 1410 can be received in the star-shaped wall 113 of the power tool. However, the accessory 1400 cannot be coupled to the oscillating power tools shown in FIGS. 5E-5G because none of the radial openings 1432*a*-1432*i* are in communication with the U-shaped opening 1420 such that the radial openings 1432*a*-1432*i* cannot receive all of the radial projections 328*a*-328*d*, 500*a*-500*d*, and 600*a*-600*d*.

Figure 15A:
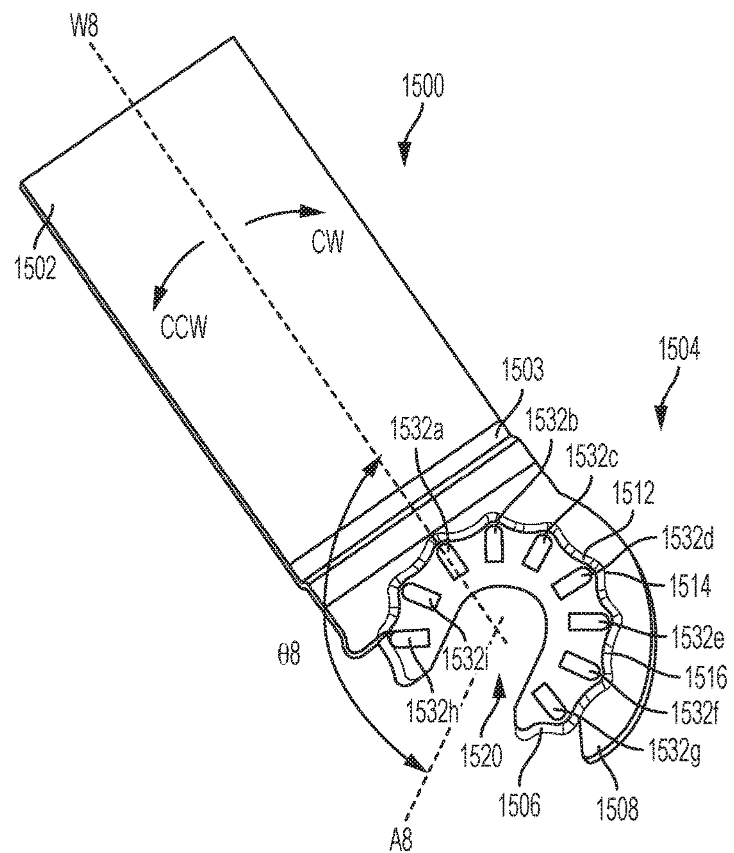
FIGS. 15A and 15B are perspective and side views of another embodiment of an accessory in accordance with the present application.
Figure 15B:
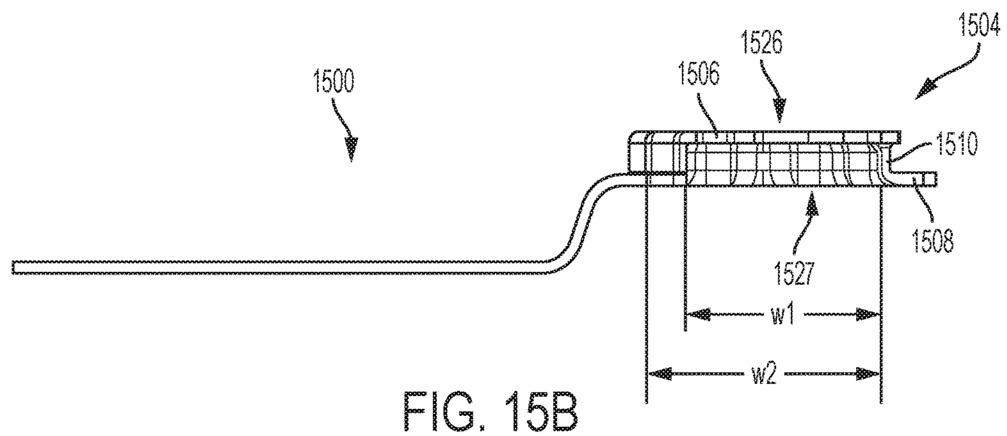

Referring to FIGS. 15A-15B, another embodiment of an oscillating accessory 1500 according to the present application includes a working end portion 1502 and an attachment portion 1504, similar to the working end portion 1402 and the attachment portion 1404 of the accessory 1400 shown in FIG. 14. The working end portion 1502 defines and extends along a working end axis W8 and is configured to perform an operation on a workpiece. The attachment portion 1504 is coupled to a rear end portion 1503 of the working end portion 1502 and is configured to be coupled to a plurality of different configurations of accessory attachment mechanisms on brands of oscillating power tools described above. Like the attachment portion 1404, the attachment portion 1504 includes a top planar wall 1506, a generally parallel bottom planar wall 1508, and a peripheral wall 1510 that extends at least partially around the attachment portion 1504 between the top wall 1506 and the bottom wall 1508 and that forms at least a portion of a polygonal shape. The top wall 1506 defines a generally U-shaped opening 1520, similar to the U-shaped opening 1420, extending along an attachment portion axis A8 that is at an angle θ8 to the working end axis W8 (e.g., an obtuse angle such as approximately 120° to 150°) in a counterclockwise direction CCW from the working axis W8.

The top wall 1506 also defines a plurality of a radial openings 1530 that include radial openings 1532*a*-1532*i* spaced radially from the central U-shaped opening 1520, similar to radial openings 1432*a*-1432*i* in the accessory 1400, with all of the radial openings 1532*a*-1532*i* spaced radially from the central U-shaped opening 1520 and with none of the radial openings 1532*a*-1532*i* in communication with the U-shaped opening 1520. The radial openings 1532*a*-1532*i* are evenly spaced about a circumference of the top wall 1506 (e.g., approximately every 30° about the top wall 1406), and are numbered in a counterclockwise direction CCW from the working axis W8.

For example, the peripheral wall 1510 includes a plurality of sidewalls 1512, similar to sidewalls 1412, which are angled relative to one another with adjacent sidewalls joined at outer vertices 1514 and inner vertices 1516 to form at least a portion of a star shape. For example, the sidewalls 1512 may form a portion (e.g., at least 7 points or 9 points) of a 12 point star shape. The top wall 1506 has a first gap 1526 and the peripheral wall 1512 has a second gap 1527, with the first gap 1526 having a first width w1 that is smaller than a second width w2 of the second gap 1527, to enable clamping bolts of the aforementioned oscillating power tools to be inserted beneath the top wall 1506 without removing the clamping bolt from the oscillating power tool. The oscillating accessory 1500 differs from the oscillating accessory 1100 insofar as the sidewalls 1512 are not inclined inward from the bottom wall 1508 toward the top wall 1506 at an angle, but instead are substantially perpendicular to both the top wall 1506 and the bottom wall 1508, as shown in FIG. 15B.

The oscillating accessory 1500 differs from the oscillating accessory 1400 insofar as the openings in the attachment portion 1504 are a mirror image of the openings in the attachment portion 1404. In the attachment portion 1404, the attachment axis A7 extends at an angle θ7 in a clockwise direction CW from the working axis W7, while in the attachment portion 1504, the attachment axis A8 extends at an angle θ8 in a counterclockwise direction CCW from the working axis W8. Similarly, in the attachment portion 1404, the plurality of openings 1432*a*-1432*i* are numbered consecutively in a counterclockwise direction CCW from the working axis W7, while in the attachment portion 1504, the plurality of openings 1532*a*-1532*i* are numbered consecutively in a clockwise direction CW from the working axis W8.

Since the attachment portion 1504 is simply a mirror Image of the attachment portion 1404, the accessory 1500 is similarly somewhat less universal than the accessories 700, 900, 1200, 1300 described above. The accessory 1500 can be coupled to the oscillating power tools shown in FIGS. 5A-5D because the radial openings can receive the projections 78*a*-78*h*, 78*a*'-78*h*', 400*a*-400*d*, and 212*a*-212*l* of these power tools. The accessory 1500 also can be coupled to the oscillating power tool shown in FIG. 5H because the U-shaped opening 1520 can receive the legs 104*a*, 104*b*, and the star shaped peripheral wall 1510 can be received in the star-shaped wall 113 of the power tool. However, the accessory 1500 cannot be coupled to the oscillating power tools shown in FIGS. 5E-5G because none of the radial openings 1532*a*-1532*i* are in communication with the U-shaped opening 1520 such that the radial openings 1532*a*-1532*i* cannot receive all of the radial projections 328*a*-328*d*, 500*a*-500*d*, and 600*a*-600*d*.

Like the accessories 700, 900, 1000, and 1100, the accessories 1200, 1300, 1400, and 1500 may be rotated and coupled to the power tools of FIGS. 5A-5H at various other angles relative to the power tool axis X (e.g., at 30° increments or 90° Increments). Also, because the attachment axes A5, A6, A7, and A8 of the U-shaped slots 1220, 1320, 1420, and 1520 are each at an obtuse angle (e.g., approximately 120° to 150°) relative to their respective working axis W5, W6, W7, and W8, the accessories 1200, 1300, 1400, and 1500 can be tightly retained in Starlock® branded oscillating powertools when the working axes W5, W6, W7, and W8 are aligned with or perpendicular to the tool housing axis X, since both legs 104*a*, 104*b* of the power tool will engage at least a portion of the top walls 1204, 1304, 1404, and 1504, as shown with respect to accessory 700 in FIGS. 8A-8C.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or Illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. An accessory for coupling to an attachment mechanism of an oscillating power tool, the accessory comprising:

a working end portion defining and extending along a working axis and configured to perform an operation on a workpiece; and an attachment portion coupled to the working end portion, the attachment portion including: (a) a top wall; (b) a bottom wall spaced apart from the top wall; (c) a peripheral wall extending between the top wall and the bottom wall, partially around the top wall, to form at least a portion of a polygonal shape with a gap in the peripheral wall; (d) a generally U-shaped opening defined in the top wall, the U-shaped opening extending along an attachment axis at an angle to the working axis, having a central portion at a center of the attachment portion, and open to the gap in the peripheral wall; and (e) a plurality of radial openings defined in the top wall and arranged between the U-shaped opening and the peripheral wall, wherein the peripheral wall, the U-shaped opening, and the plurality of radial openings are configured to couple the attachment portion to at least two different configurations of accessory attachment mechanisms on different brands of oscillating power tools.

2. The accessory of claim 1, wherein the radial openings extend in a direction radially outward from the central portion.

3. The accessory of claim 1, wherein the plurality of radial openings are spaced equiangularly in a circumferential direction around the central portion.

4. The accessory of claim 1, wherein the plurality of radial openings includes a first plurality of radial openings in communication with the central portion of the U-shaped opening and a second plurality of radial openings not in communication with the U-shaped opening.

5. The accessory of claim 4, wherein the first plurality of radial openings includes a first radial arm slot extending from the central portion along the working axis, a second radial arm slot extending from the central opening at approximately 90° from the working axis, and a third radial arm slot extending from the central opening at approximately 180° from the working axis.

6. The accessory of claim 5, wherein the second plurality of radial openings includes a first pair of radial openings spaced radially from the central portion and between the first and second radial arm slots, and a second pair of radial openings spaced radially from the central portion and between the second and third radial arm slots.

7. The accessory of claim 6, wherein the second plurality of openings further includes a third pair of radial openings spaced radially from the central portion between the first radial arm slot and the U-shaped opening.

8. The accessory of claim 1, wherein the attachment axis is at an obtuse angle to the working axis.

9. The accessory of claim 8, wherein the obtuse angle is between approximately 120 degrees and approximately 150 degrees.

10. The accessory of claim 1, wherein the peripheral wall comprises a plurality of sidewalls that form the at least a portion of the polygonal shape.

11. The accessory of claim 10, wherein the plurality of sidewalls form at least a portion of a star shape, with adjacent sidewalls joined to form outer vertices and inner vertices of the at least a portion of the star shape.

12. The accessory of claim 11, wherein each of outer vertices is aligned with one of the radial openings.

13. The accessory of claim 11, wherein the portion of a star shape comprises a portion of a 12-pointed star.

14. The accessory of claim 1, wherein each sidewall is inclined inward from the bottom wall toward the top wall at an angle.

15. The accessory of claim 1, wherein each sidewall is substantially perpendicular to the top wall and to the bottom wall.

16. An accessory configured to be coupled to a first attachment mechanism of a first oscillating power tool that includes a central projection and plurality of circumferentially spaced projections radially outward from the central projection, and configured to be coupled to a second attachment mechanism of a second oscillating power tool having two opposed legs that are radially expandable along a tool axis and a circumferential wall having an internal polygonal shape, the accessory comprising:

a working portion defining and extending along a working axis and configured to perform an operation on a workpiece; and an attachment portion coupled to the working portion, the attachment portion including: (a) a top wall; (b) a bottom wall spaced apart from the bottom wall; (c) a peripheral wall extending between the top wall and the bottom wall and partially around the top wall to form at least a portion a polygonal shape with a gap in the peripheral wall, where the polygonal shape of the peripheral wall corresponds to the polygonal shape of the second attachment mechanism; (d) a generally U-shaped opening defined in the top wall, the U-shaped opening extending along an attachment axis at an obtuse angle to the working axis, having a central portion at a center of the attachment portion, and open to the gap in the peripheral wall; and (e) a plurality of radial openings defined in the top wall and arranged between the U-shaped opening and the peripheral wall, wherein the obtuse angle and the radial openings are arranged so that the U-shaped opening receives the central projection and at least a portion of the radial openings receive at least a portion of the projections when the attachment portion is coupled to the first oscillating power tool, and wherein the obtuse angle and the peripheral wall are arranged so that both of the opposed legs of the second oscillating power tool engage at least a portion of the top wall and the circumferential wall engages the peripheral wall when the attachment portion is retained in the second oscillating power tool with the working axis aligned with or perpendicular to the tool axis.

17. The accessory of claim 16, wherein the plurality of radial openings includes a first plurality of radial openings in communication with the central portion of the U-shaped opening and a second plurality of radial openings not in communication with the U-shaped opening.

18. The accessory of claim 16, wherein the peripheral wall comprises a plurality of sidewalls that form a portion of a star shape, with adjacent sidewalls joined to form outer vertices and inner vertices of the portion of the star shape.

19. The accessory of claim 16, wherein the U-shaped opening and the plurality of radial openings are arranged so that the attachment portion can be coupled to a third attachment mechanism of a third oscillating power tool.

* * * * *